(12) United States Patent
Honda et al.

(10) Patent No.: US 7,249,644 B2
(45) Date of Patent: Jul. 31, 2007

(54) ELECTRIC VEHICLE

(75) Inventors: Satoshi Honda, Saitama (JP); Yoshihisa Kanno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/832,974

(22) Filed: Apr. 27, 2004

(65) Prior Publication Data

US 2004/0238242 A1    Dec. 2, 2004

(30) Foreign Application Priority Data

May 30, 2003  (JP) ............................. 2003-155458
May 30, 2003  (JP) ............................. 2003-155836

(51) Int. Cl.
*B60K 1/00* (2006.01)
*H02K 11/00* (2006.01)

(52) U.S. Cl. ....................... 180/65.5; 180/22; 310/68 B

(58) Field of Classification Search ............... 180/65.1, 180/65.3, 65.6, 65.5, 65.8, 68.1, 68.3, 68.5, 180/220, 229, 219, 218; 310/75 C, 67 A, 310/67 R, 89, 68 B
See application file for complete search history.

(56) References Cited

U.S. PATENT DOCUMENTS

| | | | | |
|---|---|---|---|---|
| 1,747,560 A | * | 2/1930 | Weathers ................... | 310/67 R |
| 3,566,165 A | * | 2/1971 | Lohr .......................... | 310/67 R |
| 5,087,229 A | * | 2/1992 | Hewko et al. .............. | 180/65.5 |
| 5,222,572 A | * | 6/1993 | Yamagiwa et al. ......... | 180/220 |
| 5,382,854 A | * | 1/1995 | Kawamoto et al. ........ | 180/65.6 |
| 5,613,569 A | * | 3/1997 | Sugioka et al. ............ | 180/68.5 |
| 5,644,202 A | * | 7/1997 | Toriyama et al. ........... | 318/369 |
| 5,647,450 A | * | 7/1997 | Ogawa et al. .............. | 180/220 |
| 5,691,584 A | * | 11/1997 | Toida et al. ................ | 180/65.5 |
| 6,176,338 B1 | * | 1/2001 | Nakagawa et al. ......... | 180/219 |
| 6,217,051 B1 | * | 4/2001 | Nakagawa et al. ......... | 280/303 |
| 6,276,481 B1 | * | 8/2001 | Matsuto et al. ............ | 180/65.2 |
| 6,590,306 B2 | * | 7/2003 | Terada ....................... | 310/75 C |
| 6,761,241 B2 | * | 7/2004 | Kohda ........................ | 180/219 |
| 7,017,694 B2 | * | 3/2006 | Shirazawa ................. | 180/65.5 |

FOREIGN PATENT DOCUMENTS

| | | |
|---|---|---|
| JP | 06247374 | 9/1994 |
| JP | 11034965 | 2/1999 |

* cited by examiner

*Primary Examiner*—Hau Phan
(74) *Attorney, Agent, or Firm*—Carrier, Blackman & Associates, P.C.; William D. Blackman; Joseph P. Carrier

(57) ABSTRACT

An electric vehicle is provided with a drum brake unit on a rear wheel rotated by drive force of an electric motor. A first set of fins, for cooling the electric motor and the drum brake unit, are provided between the electric motor and the drum brake unit. Specifically, the first set of fins are provided on an inner side surface of a case body. It is possible to cool the electric motor using the first set of fins, and it is also possible to remove heat of the drum brake unit using the first set of fins. The fins act as a heat sink to dissipate heat generated by the drum brake unit, and to resist heat transfer from the drum brake unit to the electric motor, helping to more efficiently cool the electric motor.

16 Claims, 20 Drawing Sheets

ELECTRIC VEHICLE

CROSS-REFERENCE TO RELATED APPLICATIONS

The present invention claims priority under 35 USC 119 based on Japanese patent applications Nos. 2003-155458, filed May 30, 2003 and 2003-155836, both filed May 30, 2003.

1. Field of the Invention

The present invention relates to an electric vehicle provided with a brake unit on a drive wheel thereof, and to an electronic control module for controlling electrical power supplied to an electric motor. More particularly, the present invention relates to an electric vehicle provided with a brake unit on a drive wheel, wherein cooling is provided for the electric motor and the braking unit, and to an electronic control module for controlling electrical power supplied to an electric motor, where various airflows and components are used to remove heat from the system.

2. Description of the Background Art

As an electric vehicle, it is known to have a controller for carrying out control of an electric motor and electrical equipment arranged inside a swing-type power unit (for example, refer to Japanese patent laid open No. Hei. 11-34965 page 3–5, FIG. 5).

FIG. 5 of Japanese patent laid open No. Hei. 11-34965 will be described in the following discussion, with reference to FIG. 19 of the present application. FIG. 19 is a reproduction of a drawing from Japanese patent laid open No. Hei. 11-34965, with reference numerals changed.

FIG. 19 is a bottom view showing a power unit of an electric vehicle of the related art, and shows an electric motor (not shown) and a reduction gear 302 stored in a rear half section of a power unit 301, a hollow box section 303 provided in a front half section of the power unit 301, and a controller 306 for controlling the electric motor and electrical equipment arranged in a space 304 inside the hollow box section 303. Reference numerals 307, 307 are axial bearing boss sections for attachment of the power unit 301 to the vehicle body side in such a manner as to swing up and down.

The controller 306 contains FETs (Field Effect Transistors) etc., and is preferably fitted with some type of cooling structure because of heat generated during operation. Because the above-described controller 306 is arranged inside the space 304, it is difficult to effectively get rid of heat from the controller 306.

Also, in the case where the power unit 301 is impacted from the vehicle body side, the impact load is applied to a sidewall of the power unit 301 (a side wall at the upper side in the drawing), and the controller 306 is likely to be damaged. With respect to this type of load it has been considered to make the sidewall of the power unit thick, and to attach a separate protection member to the power unit, but this increases weight, increases the number of components and increases costs.

Accordingly, it is the object of the present invention is to improve an electric vehicle in order to effectively cool an electronic control module, and to effectively protect the electrical power supply section with a simple structure.

It is also known to have forced cooling of an electric motor in an electric vehicle (see, for example, Japanese Patent No. 3385639 (pages 4–5, FIG. 3)).

FIG. 3 of Japanese Patent No. 3385639 will now be described, with reference to FIG. 20 of the present application, which is a reproduction thereof. Reference numerals in FIG. 20 of the present application have been changed from the original. FIG. 20 is a rear section side elevational view, showing a portion of an electric vehicle of the background art, and shows a direct drive type electric vehicle having a rear wheel 802 driven directly by an electric motor 801, by integrating an output shaft of the electric motor 801 with an axle shaft 803 of the rear wheel 802.

A case body 805 for holding the electric motor 801 is a member forming a cooling air passage 806 together with a case cover, and a duct 807 is connected to this cooling air passage 806 with a fan (not shown) being arranged at an upstream side of the duct 807. For example, the fan operates if the temperature of the electric motor 801 becomes high, and outside air is supplied to the electric motor 801, through the duct 807 and cooling air passage 801, to cool the electric motor 801.

Because the brake unit is provided on the rear wheel 802 described above, when the brake unit is operated the brake unit generates heat, and this heat is conveyed through the axle shaft 803 and the case body 805 to the electric motor 801. Since heat is also generated in the electric motor 801 during operation, it can be expected that the temperature of the electric motor 801 will rise excessively. Accordingly, if heat transfer from the brake unit to the electric motor 801 is suppressed, and the electric motor 801 is cooled, it is possible to prevent excessive temperature rise of the electric motor 801.

Also, with the electric vehicle described above, in order to cool the electric motor 801, since there is a structure provided with the cooling air passage 806, duct 807 and the fan, the structure is complicated and there are a lot of parts, which increases the cost.

It is another object of the present invention to improve a heat-dissipating structure for an electric vehicle, in order to effectively cool an electric motor, and to control costs required for cooling the vehicle.

Accordingly, it is another object of the present invention to provide an electric vehicle provided with a brake unit on a drive wheel, wherein cooling is provided for the electric motor and the braking unit.

SUMMARY OF THE INVENTION

In order to achieve the above-described objects, a first aspect of the present invention is directed to an electric vehicle, provided with a brake unit on a drive wheel rotated by drive power from an electric motor, wherein a cooling apparatus, for cooling the electric motor and the brake unit, is provided between the electric motor and the brake unit.

It is possible to cool the electric motor using the cooling apparatus, and also to cool the brake unit using the cooling apparatus. The cooling apparatus hereof also resists heat transfer from the brake unit to the electric motor.

According to a second aspect of the present invention, an electric vehicle is provided with a brake unit on a drive wheel rotated by drive power from an electric motor, wherein the control unit is attached to a case of the electric motor, and the case is divided in two, with cooling fins provided on at least one of divided parts of the case.

It is possible to release heat from the electric motor through the cooling fins, and it is also possible to release heat from the brake unit through the cooling fins, via the electric motor case. Also, since fins are provided on the case, it is possible to control manufacturing costs required for cooling.

According to a third aspect of the present invention, a cooling apparatus is provided with a hole section for receiving a drive wheel axle therethrough. It is possible to support the axle in the hole section of the cooling apparatus, and it is possible to carry out positioning of the cooling apparatus and the drive wheel using the axle.

According to a fourth embodiment of the present invention, a cooling apparatus is provided with a plurality of fins. It is possible to carry out natural cooling using traveling air using the fins, and it is also possible to reduce weight, as compared to using a forced-air cooling apparatus, such as a fan.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 1:
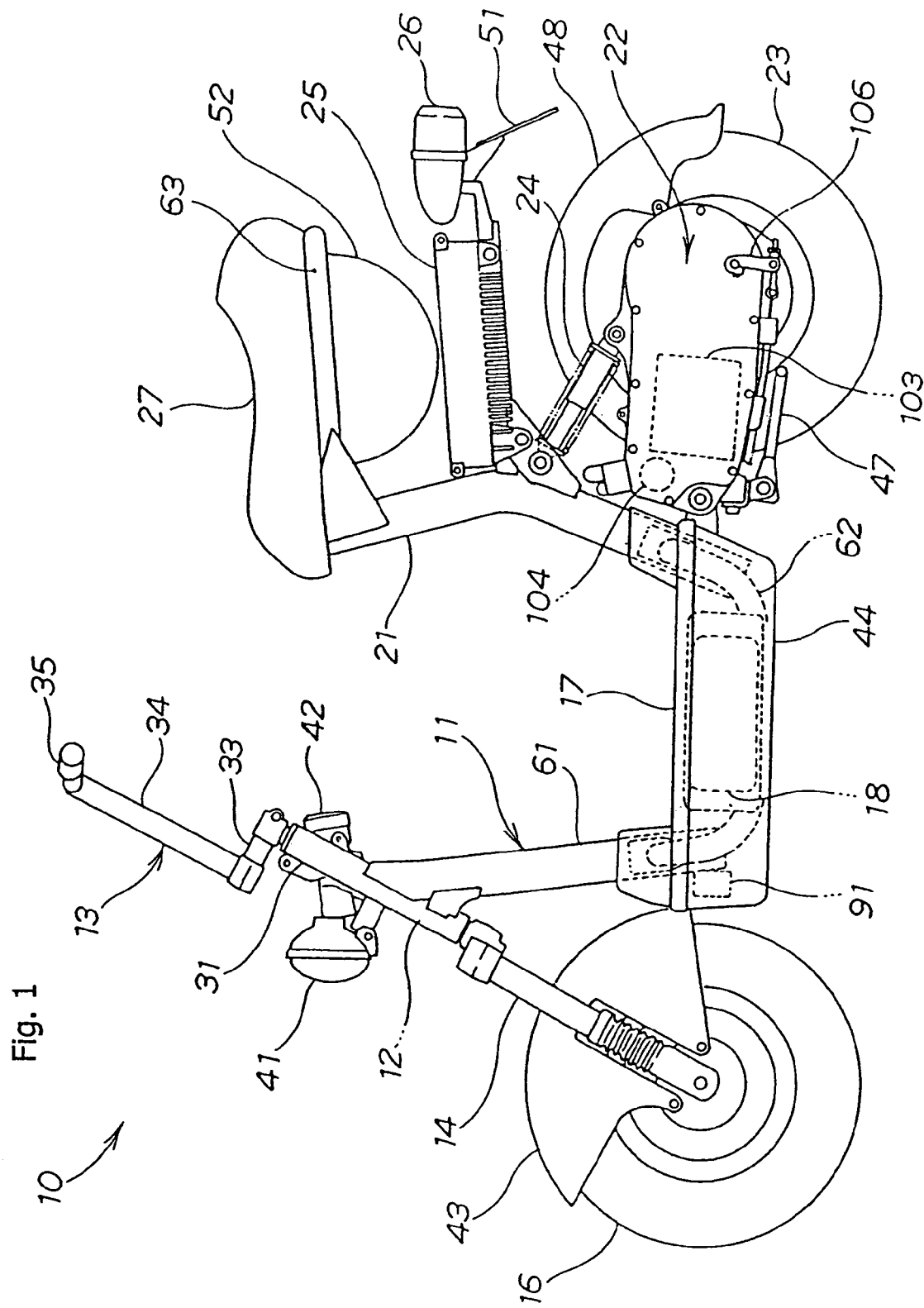
FIG. 1 is a side elevational view of an electric vehicle according to a selected illustrative embodiment of the present invention.

A number of embodiments of the present invention will now be described, with reference to the accompanying drawings. The drawings are viewed in the direction of the reference numerals. It should be understood that the embodiments described herein are intended to illustrate, rather than to limit the present invention.

FIG. 1 is a side elevational view of an electric vehicle 10 according to a selected illustrative embodiment of the present invention. The electric vehicle 10 includes a vehicle frame 11, with a handle shaft 12 attached to a front part of the vehicle frame 11, a handle 13 pivotally attached to an upper part of the handle shaft 12, and a front fork 14 attached to a lower part of the handle shaft 12. The electric vehicle 10 also includes a front wheel 16 attached to a lower end of the front fork 14, a floor step plate 17 provided in a middle section of the vehicle frame 11, and batteries 18 arranged below the floor step plate 17. The batteries 18 each have a plurality of cylindrical battery cells wrapped in a resin shrink pack (shrink pack: wrapping material that shrinks when heated).

The electric vehicle 10 also includes a swing-type power unit 22, attached in a vertically swingable manner to a lower part of a seat post 21, constituting a rear section of the vehicle frame 11. The electric vehicle 10 also includes a rear wheel 23, as a drive wheel, attached to a rear part of the power unit 22, and a rear shock absorber 24, extending between an upper part of the power unit 22 and the seat post 21.

The electric vehicle 10 further includes a charger/voltage converter unit 25 attached to a middle section of the seat post 21, a tail lamp 26 arranged to the rear of the charger/voltage converter unit 25, and a seat 27, attached to an upper end of the seat post 21.

The vehicle frame 11 is provided with a head pipe 31, pivotally supporting the handle shaft 12. The handle 13 is made up of an arm 33 attached to an upper end of the handle shaft 12, a handle support member 34 extending upwards from the arm 33, and a handlebar 35, attached to an upper end of the handle support member 34. By providing the handle support member 34, it is possible to arrange the head pipe 31 at a low-mount position on the frame 11, and it is possible to make the vehicle frame 11 small in size. As a result, it is possible to reduce the weight of the vehicle frame 11.

The charger/voltage converter unit 25 includes a charger for rectifying a commercial mains supply to DC, and stepping down a specified voltage to have current flow into a battery 18, and a DC-DC converter for converting a battery voltage, that is a high voltage used to drive the electric motor, to a low voltage for the tail lamp and electrical components.

Specifically, the charger/voltage converter unit 25 is generally composed of a charger and a DC-DC converter. Hereafter, with this embodiment, the charger/voltage converter unit 25 will be described as a charger and DC-DC converter, but obviously it is also possible to have the charger and the DC-DC converter provided separately. For example, it is possible to have the charger adjacent to the battery 18, and to have the DC-DC converter adjacent to electrical components such as the tail lamp.

Here, reference numerals 41 and 42 designate a headlamp and a main switch, respectively, attached to a front part of the vehicle frame 11. Reference numeral 43 designates a front fender covering above the front wheel 16, reference numeral 44 designates a battery tray for attaching below the floor step plate 17, and reference numeral 47 designates a side stand. Reference numeral 48 designates a rear fender for covering above the rear wheel 23, reference numeral 51 designates a license plate attached to a lower part of the tail lamp 26, and reference numeral 52 designates a helmet stored below the seat 27.

Figure 2:
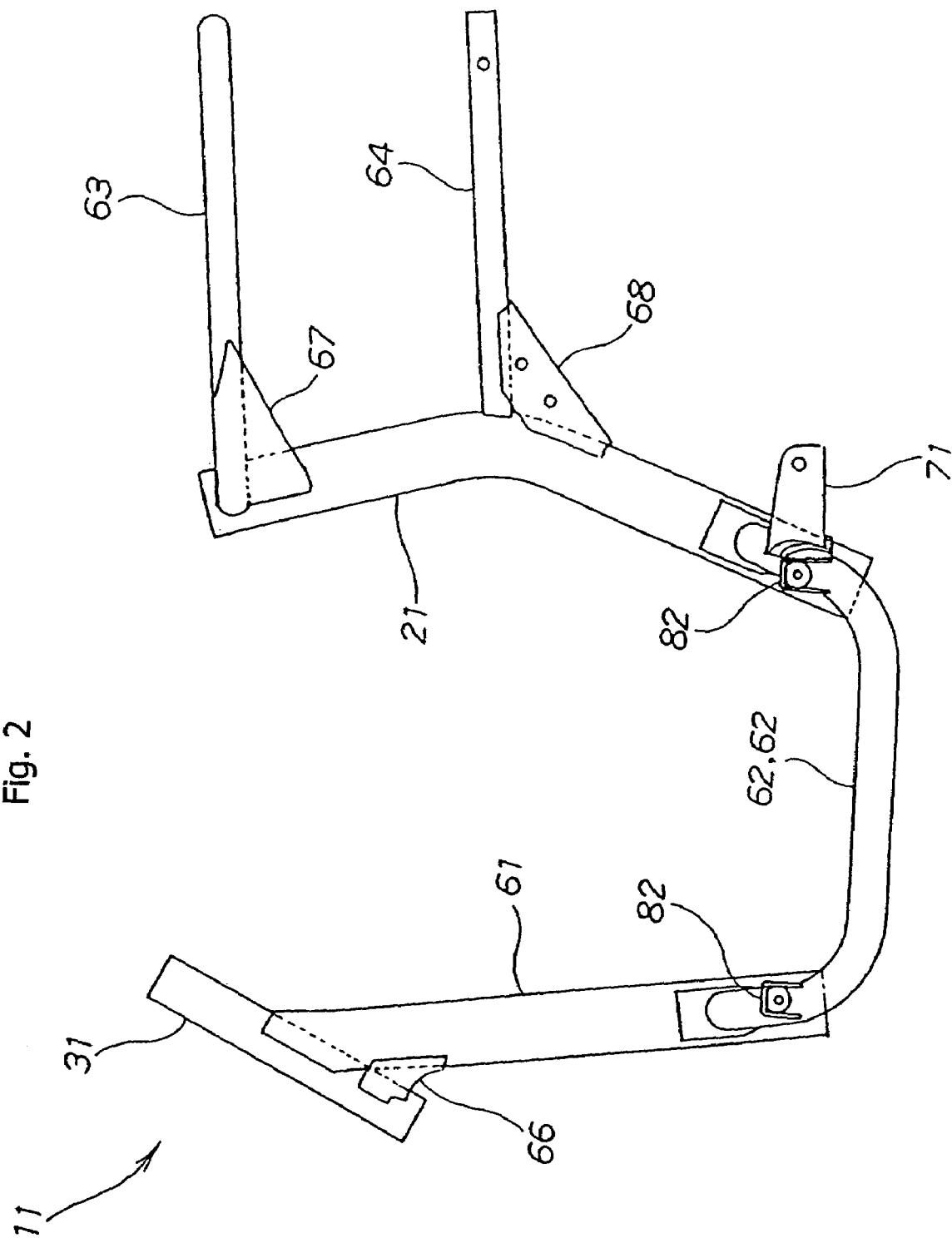
FIG. 2 is a side view showing a vehicle frame of the electric vehicle of FIG. 1.

FIG. 2 is a side elevational view of a stripped-down vehicle frame 11 for the electric vehicle of the present invention. The vehicle frame 11 includes the previously mentioned head pipe 31, a down pipe 61 extending almost straight downwardly from the head pipe 31, and a pair of left and right lower pipes 62. The lower pipes 62 are made substantially in a flattened U-shape as seen from the vantage point of FIG. 2, extending downwardly from the down pipe 61 and then horizontally to the rear and finally upwardly in a slight bend.

The vehicle frame 11 also includes the aforementioned seat pipe 21, attached to the lower pipes 62 and having a sideways V-shape, along with a seat frame 63 extending rearwards from an upper end of the seat post 21, and a mid-frame 64 extending rearwards form a middle part of the seat post 21. Reinforcement members 66, 67, 68, and a power unit support member 71 are attached to the seat post 21. The power unit support member 71 is provided for attachment of a swing shaft of the power unit 22 (refer to FIG. 1).

By forming the head pipe 31, down pipe 61, lower pipes 62, 62 and seat post 21 of the vehicle frame 11 into a substantially U-shape, as shown in FIG. 1, the handle 13 and the seat 27 are supported at end sections of the U-shape, making an extremely simple vehicle frame 11 possible, while providing the essential functions of the electric vehicle, namely supporting the floor step plate 17 and storing the battery 18 at a bottom of the U-shape.

Figure 3:
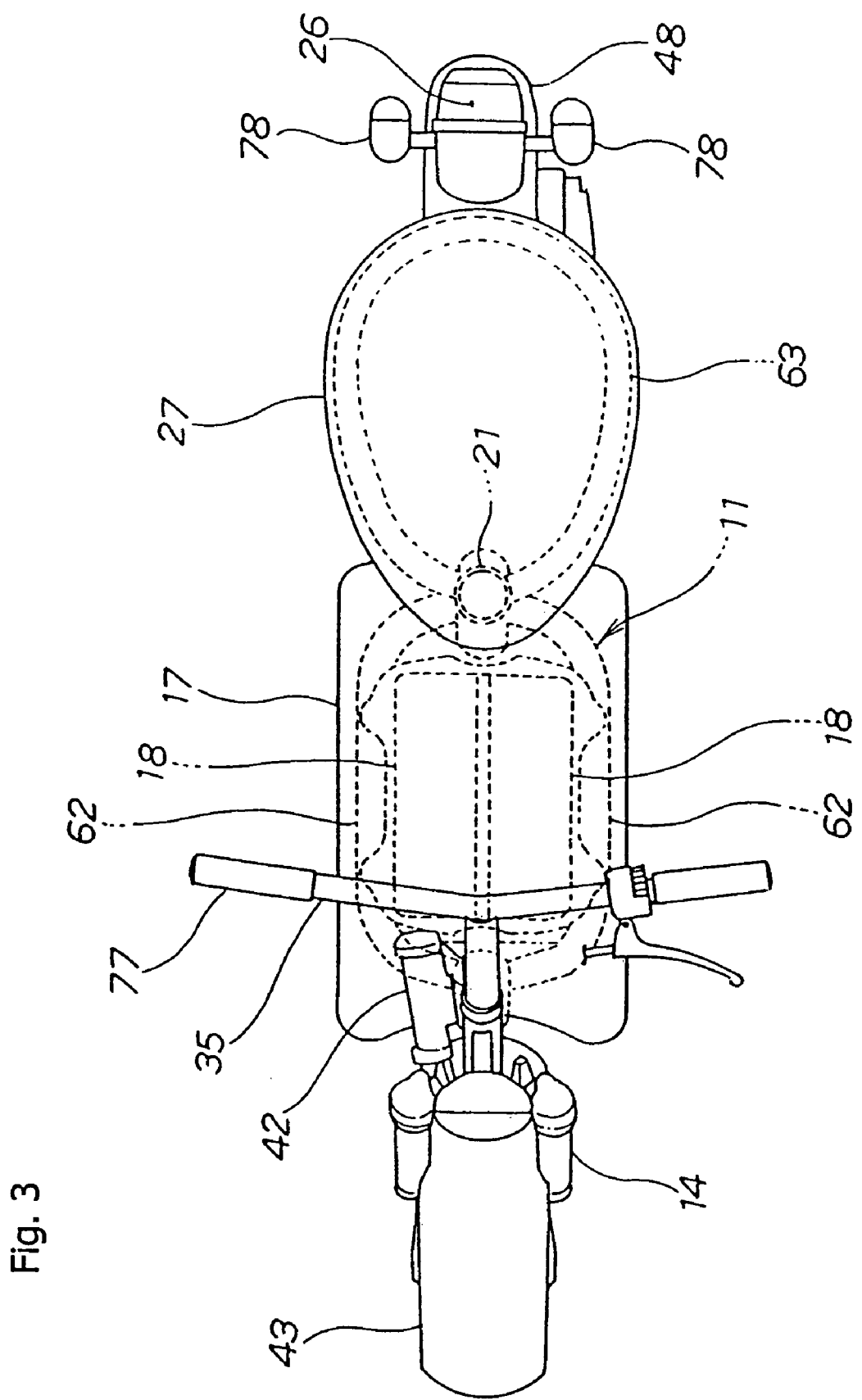
FIG. 3 is a top plan view of the electric vehicle of FIG. 1.

FIG. 3 is a top plan view of the electric vehicle of FIG. 1, and shows lower pipes 62, 62 of the vehicle frame 11 arranged below a substantially rectangular floor step plate 17, and left and right batteries 18, 18 arranged in parallel between these lower pipes 62, 62. Reference numeral 77 designates a handgrip for controlling operation of the electric motor (described later), and 78, 78 are blinkers attached to the left and right of the tail lamp 26. The handgrip 77 may be caused to turn by pivotally rotating the grip itself, such as used in a motorcycle etc., or alternatively, may be a lever type control mechanism, such as that used with an ATV (All Terrain Vehicle) etc.

Figure 4:
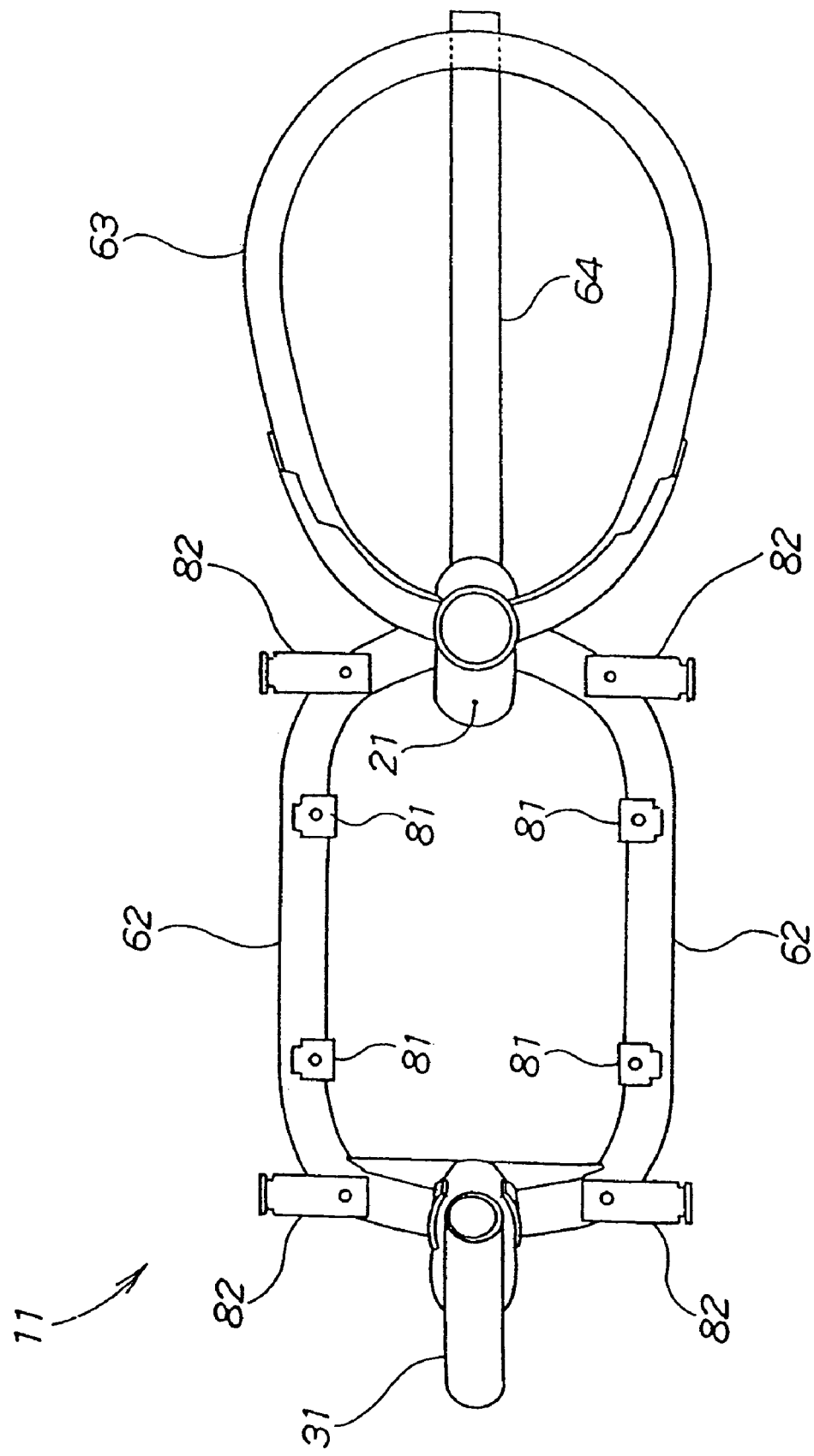
FIG. 4 is a plan view of the vehicle frame of the electric vehicle according to the present invention.

FIG. 4 is a top plan view of the stripped-down vehicle frame 11 of FIG. 2, and shows that by forming the seat frame 63 of the vehicle frame 11 into an oval, an ellipse or a shape close to these, it is possible to suspend the edge of an upside-down helmet 53 (refer to FIG. 1) at an inner side of the seat frame 63, and to store the helmet 52 below the seat frame 63, when not in use. Reference numerals 81 designate first brackets attached to the lower pipes 62 for fixing the floor step plate 17 (refer to FIG. 3) to the lower pipes 62, and the numerals 82 designate second brackets attached to the lower pipes 62 for fixing the floor step plate 17 and the battery tray 44 (refer to FIG. 1) to the lower pipes 62.

Figure 5:
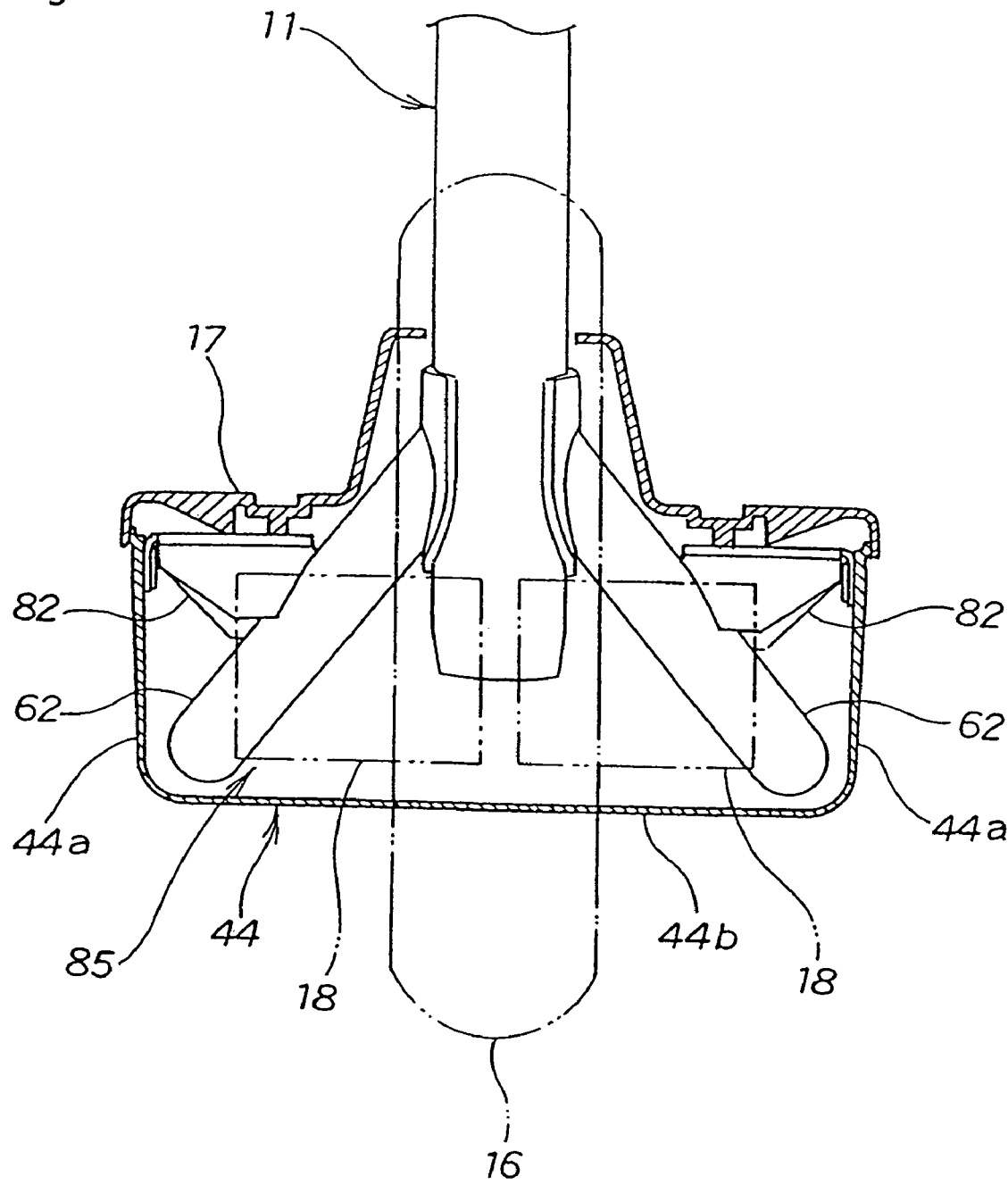
FIG. 5 is a cross sectional drawing of a front section of the vehicle frame and a floor step according to the present invention.

FIG. 5 is a cross sectional drawing showing the front of the vehicle frame and a floor step plate of the present invention, and shows the second brackets 82, 82 attached to the lower pipes 62, 62 of the vehicle frame 11. The floor step plate 17 is attached to upper parts of these second brackets 82, 82, and side surfaces 44a, 44a of the battery tray 44 are attached to side sections of the second brackets 82, 82. Reference numeral 44b designates a bottom surface of the battery tray 44.

In this way, it will be seen that the battery tray 44 is formed substantially in a bathtub shape, and cooperates with the floor step plate 17 to define a protectively sealed space 85 therebetween, and since the batteries 18, 18 are stored in this sealed space, it is possible to protect the batteries 18, 18 against mud and dirt flying up.

Figure 6:
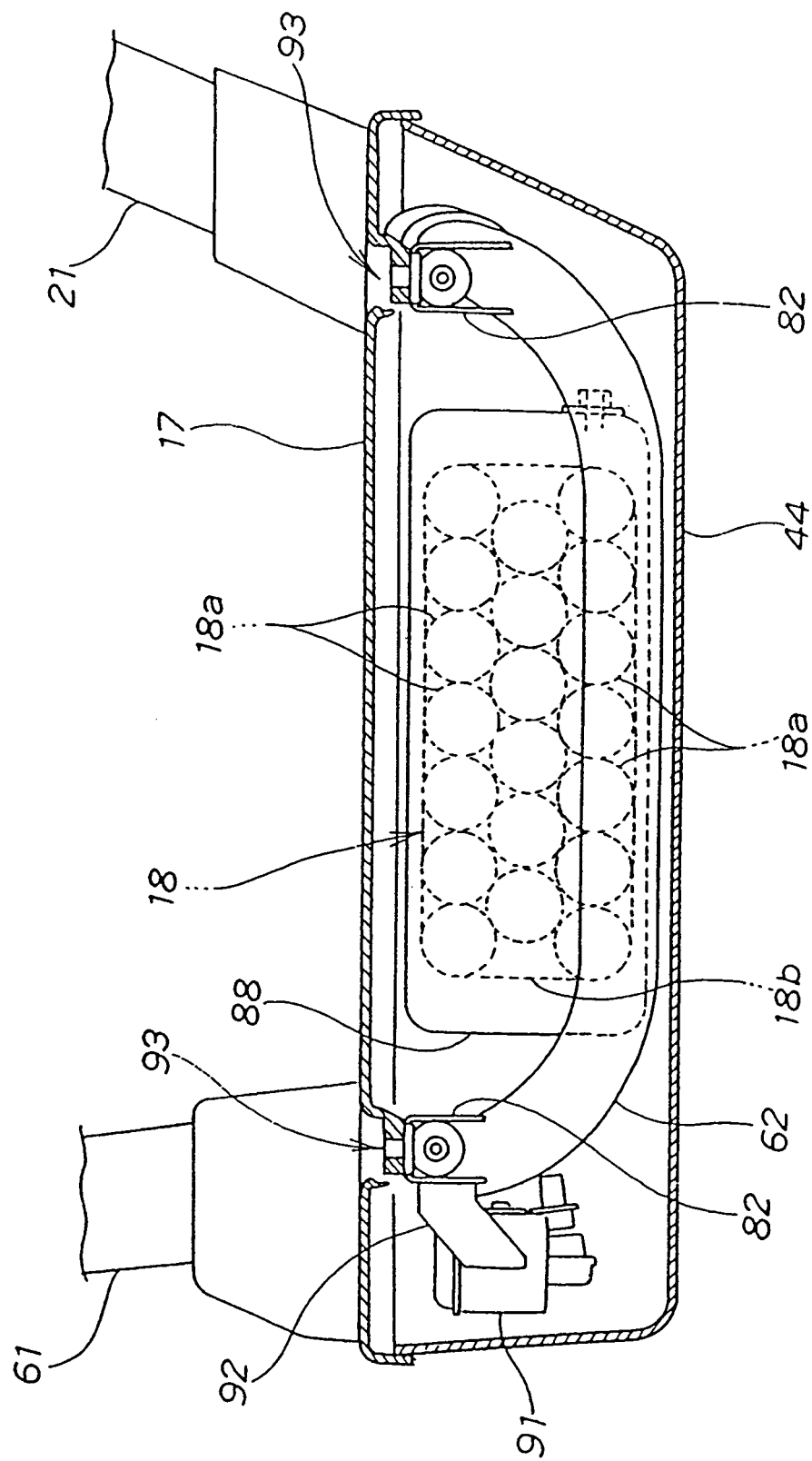
FIG. 6 is a cross sectional drawing showing batteries mounted in the electric vehicle according to the present invention.

FIG. 6 is a cross sectional drawing showing a battery housed in the battery tray 44 of the present vehicle, and the arrow (front) in the drawing represents the direction of the front of the vehicle. The battery 18 may be made up of a plurality of cylindrical nickel hydrogen battery cells 18a, wrapped by the shrink pack, and in the state contained inside the battery case 88, arranged below the floor step plate 17. Reference numeral 91 designates a blinker relay attached to one of the lower pipes 62 by means of the bracket 92, and reference numerals 93 designate attachment sections provided on the floor step plate 17 for attachment of the floor step plate 17 to the second brackets 82.

Figure 7:
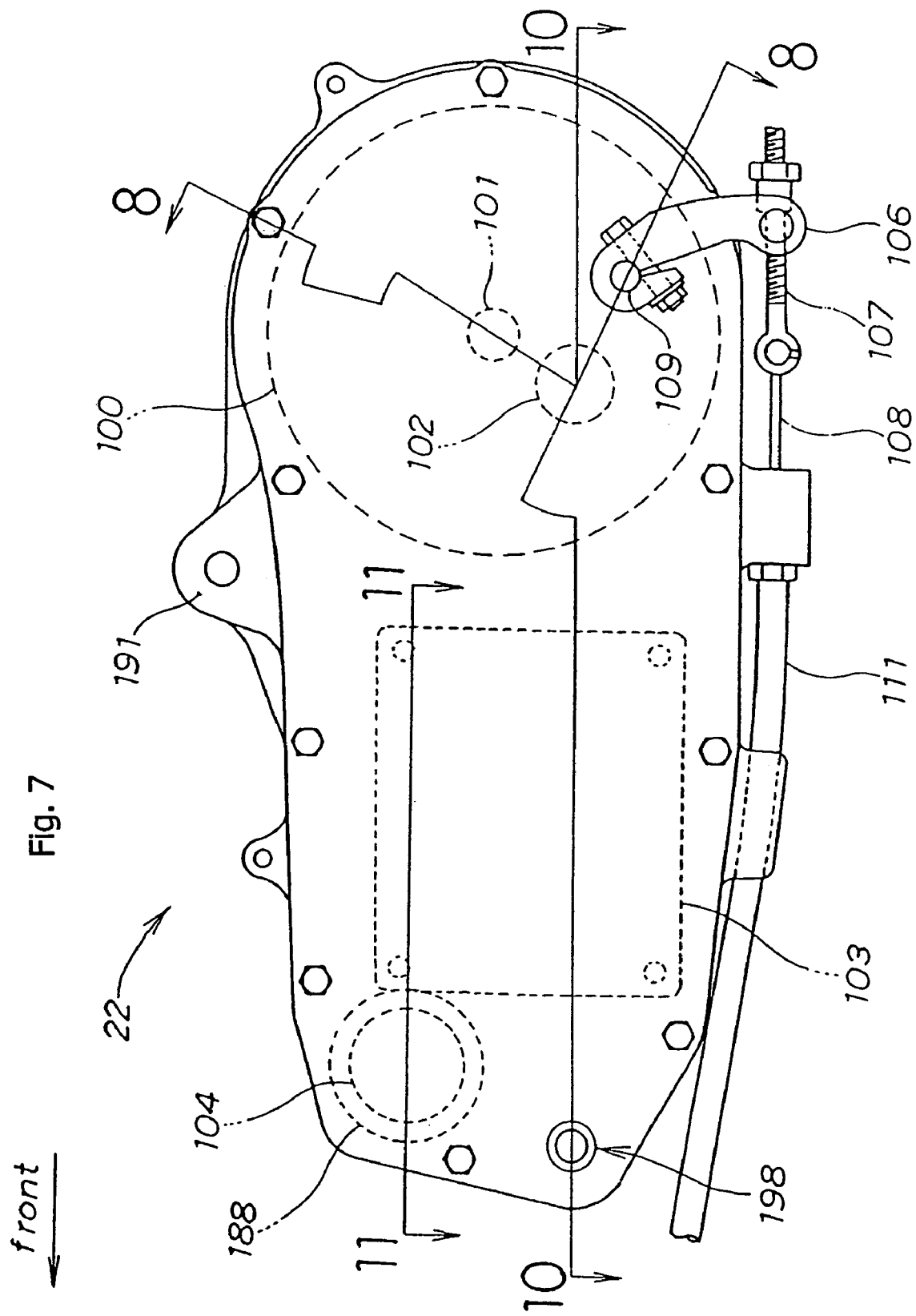
FIG. 7 is a first side view of a power unit according to the present invention.

FIG. 7 is a first side elevational view of the power unit of the present invention, and shows the power unit 22 from a side opposite to the rear wheel 23 (refer to FIG. 1). The power unit 22 has an electric motor 100 stored in a rear half section and an output shaft of the electric motor 100 connected to an axle 102 of the rear wheel 23 (refer to FIG. 1). An electronic control module 103 for controlling electrical power supplied to the electric motor 100, that is, for controlling drive of the electrical motor 100, and a smoothing capacitor 104 attached to the electronic control module 103, are each respectively attached to a front half section of the power unit 22.

A transmission system for the power unit 22 is a reduction type for transmitting output from the electric motor 100 to the rear wheel 23 via a reduction gear mechanism (described later). Also, the electronic control module 103 is made up of switching members such as power FETs (FET: Field Effect Transistor).

Also shown in FIG. 7, reference numeral 106 designates a brake arm for activating a drum brake and for braking the rear wheel 23. Reference numeral 107 desingates an adjustment member attached to a tip of the brake arm 106, 108 designates a wire connected to the adjustment member 107 and also connected to a brake lever (not shown), and 111 designates an outer sleeve movably housing the wire 108.

The brake arm 106 is made to swing via the wire 108 and adjustment member 107, and a cam member provided on a tip of a brake shaft 109 constituting a rotating shaft of the brake arm 106 is cause to turn pressing a brake shoe (described in detail later) against a brake drum (described in detail later) at the cam member, to brake the rear wheel 23. The adjustment member 107 is a member for adjusting the initial angle of the brake arm 106.

With this embodiment, the structure is such that the output shaft 101 of the electric motor 100 is arranged offset sloping upwards to the rear of the axle 102. By arranging the output shaft 101 and the axle 102 in this way, it is possible to shorten the vehicle in the longitudinal direction, and it is thereby possible to reduce the size of the vehicle. Alternatively, in a different arrangement from that shown, it is possible to arrange the output shaft 101 sloping upwards to the front.

Figure 8:
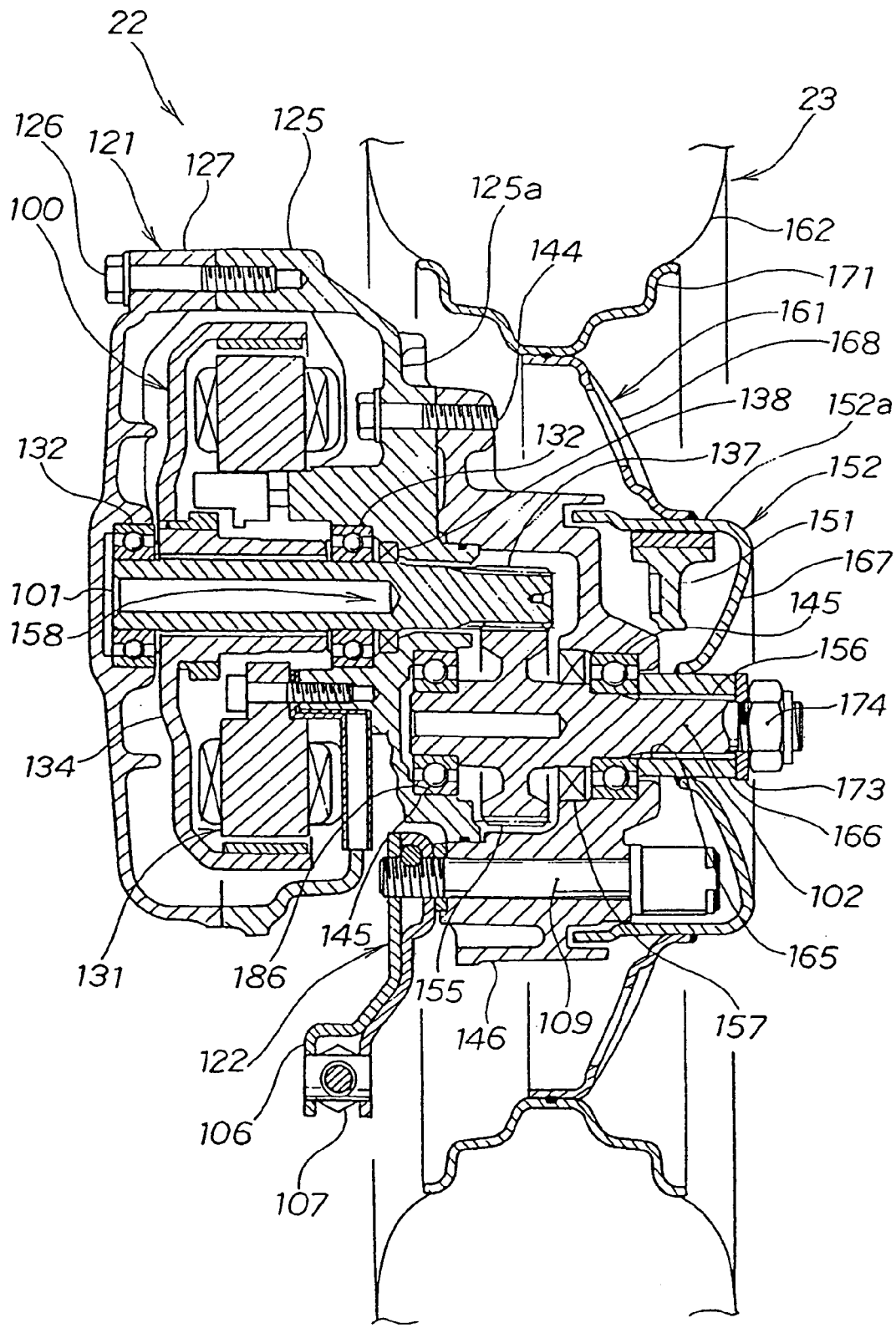
FIG. 8 is a cross sectional drawing along line 8—8 in FIG. 7.

FIG. 8 is a cross sectional view of the power unit 22, taken along line 8—8 in FIG. 7. The power unit 22 includes a unit case 121, as a case housing the electric motor 100, a drum brake unit 122, as a brake unit attached to a side surface of the unit case 121, and an axle 102 attached to the drum brake unit 122.

The unit case 121 is a two-part member, including a rear wheel side case body 125, and a case cover 127 attached by bolts 126 to an opening side of the case body 125.

The electric motor 100 is an outer rotor type motor including a stator 131 attached to the case body 125, the output shaft 101 rotatably attached to the unit case 121 via bearings 132, 132, and a rotor 134 attached to the output shaft 101 by spline fitting. Reference numeral 137 designates a toothed gear section formed on a tip of the output shaft 101, and 138 designates a dust seal.

The drum brake unit 122 is a unit attached by bolts 144 . . . to the inner surface 125a of the case body 125, and includes a base section 146 rotatably supporting the axle 102 together with the case body 125 using bearings 145, 145, the brake shaft 109 rotatably attached to the base section 146 and also attached at one end to the brake arm 106, a cam member (not shown) attached to the other end of the brake shaft 109, a brake shoe 151 opening in a radial direction as a result of being pressed with rotation of the cam member, a cap shaped brake drum 152 corresponding to the inner surface of the brake shoe 151, and the brake arm 106.

The axle 102 is a member includes a toothed gear section 155 for meshing with the gear section 137 of the output shaft 101, and a male spline 156 for joining to the rear wheel 23. Reference numeral 157 designates a dust seal provided between the base section 146 and the axle 102. The axle 102, provided with the toothed gear section 150 in cooperation with the output shaft 101, provided with the toothed section 137 forms a reduction gear mechanism 158. The rear wheel 23 includes a wheel section 161 attached to the axle 102, and a tire 162 fitted on the outside of the wheel section 161.

The wheel section 161 includes the brake drum 152, made up of a boss section 166 forming a female spline 165 for connecting to the male spline 156 of the axle 102, and a cup shaped drum section 167. The wheel section 161 also includes a disk section 168 attached to an outer surface 152a of the brake drum 152, and a rim section 171 attached to an outer part of the disk section 168. Reference numerals 173 and 174 designate washers and nuts, respectively, for attaching the rear wheel 23 to the axle 102.

Next, the structure of the power unit 22 shown in FIG. 1 will be described in more detail. The wheel section 161 is a member constructed having a central side (that is, a drum section 167 side) projected laterally outwardly from a center of the rear wheel 23 to a side opposite to the electric motor 100. That is, the boss section 166, constituting a rotational center of the rear wheel 23, is offset from the vertical center line of the rim 171.

Also, by having an arrangement where the reduction gear mechanism 158, provided between the electric motor 100 and the rear wheel 23, is pressed into the inside of the wheel section 161 that is offset in this way, even if a so-called reduction type power unit is adopted, it is possible to reduce the extent to which the power unit 22 projects from the vehicle body side with respect to the rear wheel 23. Therefore, since it is possible to arrange the power unit 22, which is heavy, and the rear wheel 23 centrally in a width direction of the vehicle, it is possible to improve the center of gravity—of the vehicle, and to improve running performance etc.

Next, the transmission of power from the electric motor 100 to the rear wheel 23 will be described. Drive current is supplied to the stator 131 under control from the electronic control module 103. Drive current control is PWM (Pulse Width Modulation) control, for example.

PWM control is a method of controlling rotational speed (and torque) of the electric motor by applying voltage pulses to the electric motor 100 and changing the duty ratio of these pulses.

Using the above-described PWM control, the rotor 134 is rotated by a rotating magnetic field generated by rotation of the stator 131, and the output shaft 101 is thus rotated. Drive force from the output shaft 101 is transmitted to the axle 102 by the reduction gear mechanism, including the toothed section 137 and the toothed section 155. In this way, drive force from the electric motor is transmitted to the rear wheel 23.

With this embodiment, a reduction mechanism having a reduction ratio using the output shaft 101 and the axle 102 that is fixed is given as an example, but it is also possible to transmit drive force from the electric motor 100 to the rear wheel 23 by gear conversion using a separate gearbox. This type of reduction gear mechanism can be, for example, a continuously variable transmission.

Further, the electric vehicle of the depicted embodiment also has a regenerative charging mechanism. Specifically, there is a function for, in the case of causing an electric vehicle to slow down using the action of a drum brake unit, front brake, engine braking etc., driving the electric motor 100 as a generator, converting rotational force, transmitted to the electric motor 100 from the rear wheel 23, at the time of deceleration, to electrical energy, and storing this energy in the batteries 18, 18.

Figure 9:
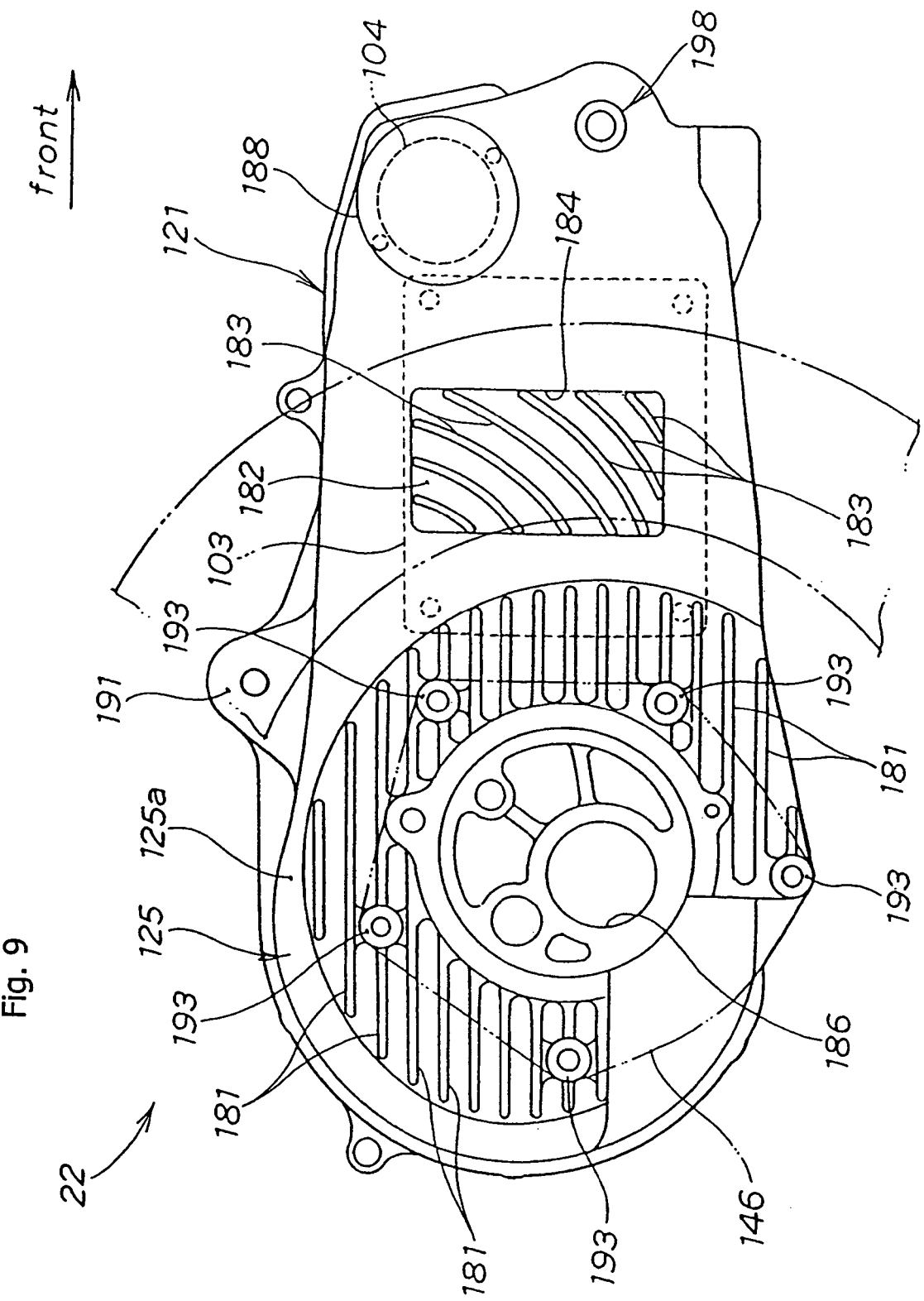
FIG. 9 is a second side view of the power unit according to the present invention.

FIG. 9 is a second side elevational view of the power unit 22 of the present invention, and is viewed from the rear wheel 23 side. The power unit 22 has first fins 181 . . . for heat radiation formed on an inner surface 125a of the case body 125 as a cooling apparatus (or cooling fins). The power unit 22 also has a rectangular window section 184 provided on the case 182 of the electronic control module 103 for exposing second fins 183 . . . to the outside formed in the front half section.

The smoothing capacitor 104 is attached to the case body 125 further forward than this window section 184, and a hole section 186 is formed in the power unit 22 for passing the axle 102 (refer to FIG. 8) therethrough. Reference numeral 188 designates a capacitor case holding the smoothing capacitor 104, and 191 designates a cushion lower end attachment section provided on the unit case 121 for attaching the lower end of the rear shock absorber 24 (refer to FIG. 1).

The substantially pentagonal member shown by the imaginary line in the drawing is a base section 146 of the drum brake unit 122 (refer to FIG. 8), and reference numerals 193 . . . designate base section attachment boss sections provided on the case body 125, for allowing attachment of the base section 146 to an inner surface of the case body.

Figure 10:
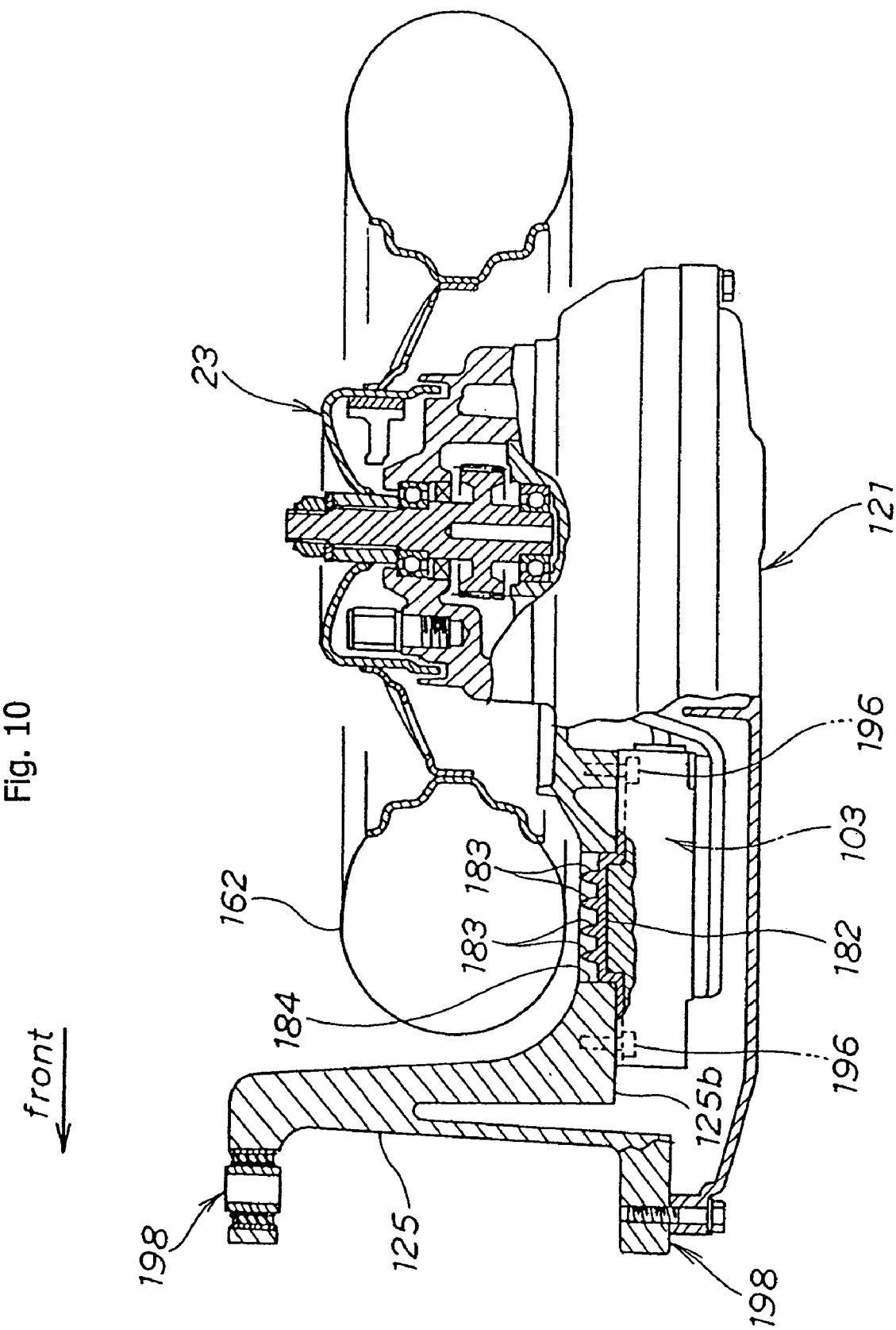
FIG. 10 is a cross sectional drawing along line 10—10 in FIG. 7.

FIG. 10 is a cross sectional drawing along line 10—10 is FIG. 7, showing the electronic control module 103 being attached to the inner surface 125b of the case body 125 of the unit case 121 with bolts 196 . . . , the case 182 of the electronic control module 103 being exposed to the outside from the window section 184 of the case body 125, and the second fins 183 . . . being adjacent to the tire 162 of the rear wheel 23. Reference numerals 198, 198 are frame attachment sections for attachment to the vehicle frame 11 (refer to FIG. 2) side power unit support member 71 (refer to FIG. 2) via the swing shaft.

Figure 11:
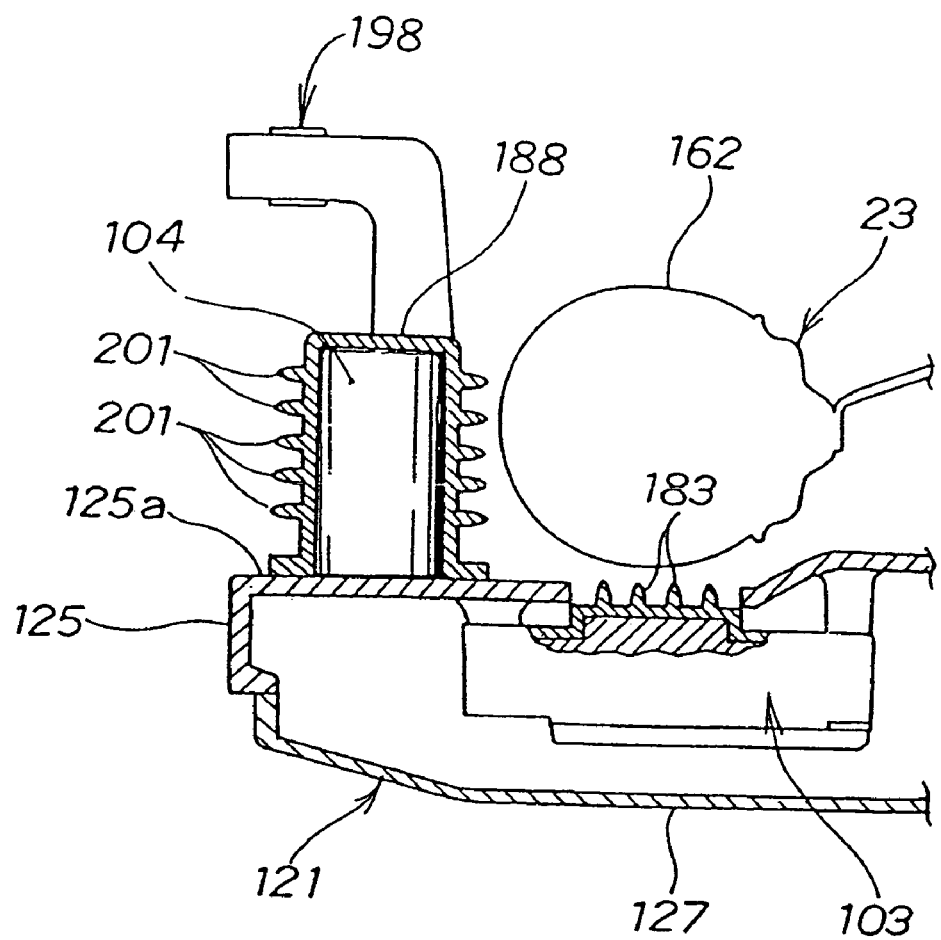
FIG. 11 is a cross sectional drawing along line 11—11 in FIG. 7.

FIG. 11 is a cross sectional drawing along line 11—11 in FIG. 7, and shows the smoothing capacitor 104 attached to a front section of the inner surface 12a of the case body 125, this smoothing capacitor 104 held inside a capacitor case 188 having third fins 201 formed at an outer surface, and the capacitor case 188 being adjacent to the rear wheel 23, or specifically, to the tire 162. The capacitor case 188 is attached to the case body using screws.

Figure 12:
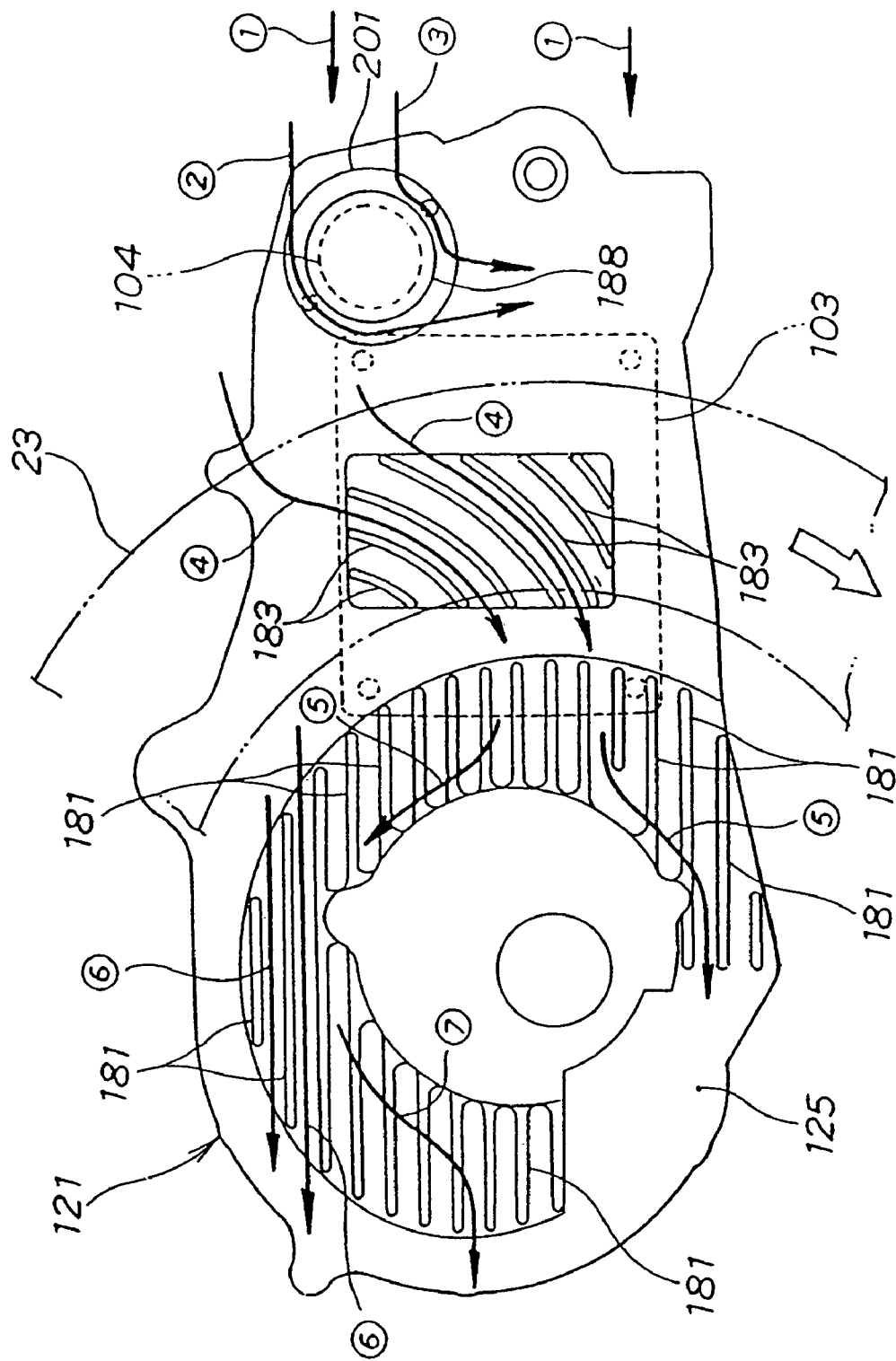
FIG. 12 is a first operational drawing showing cooling of the power unit according to the present invention.

The following is a description of a cooling operation for the power unit 22 described above. FIG. 12 is a first operational drawing showing cooling of the power unit of the present invention, for describing cooling using traveling air and air flow generated by rotation of the rear wheel 23 (shown by the imaginary lines). During travel of the electric vehicle, traveling air flows as shown by arrows ①, ①, and since the rear wheel 23 is rotating as shown by the white arrows the traveling air flows along the third fins 201 of the capacitor case 188 as shown by the arrows ② and ③, due to addition of the air flow generated in the rotating direction of the vehicle wheel adjacent to the rear wheel 23, and also downwards, to take heat away from the smoothing capacitor 104 through the capacitor case 188.

Also, the traveling air flows as described above and along the second fins 183 . . . of the electronic control module 103, as shown by the arrows ④, ④, which means that heat is taken away from the electronic control module 103. The traveling air also flows adjacent to the first fins 181 . . . of the case body 125, as shown by arrows ⑤, ⑤, and along the first fins 181 . . . as shown by arrows ⑥, ⑥, while some of the traveling air shown by the arrow ⑥ flows around the base attachment section and adjacent to the first fins 181, as shown by arrow ⑦.

Figure 13:
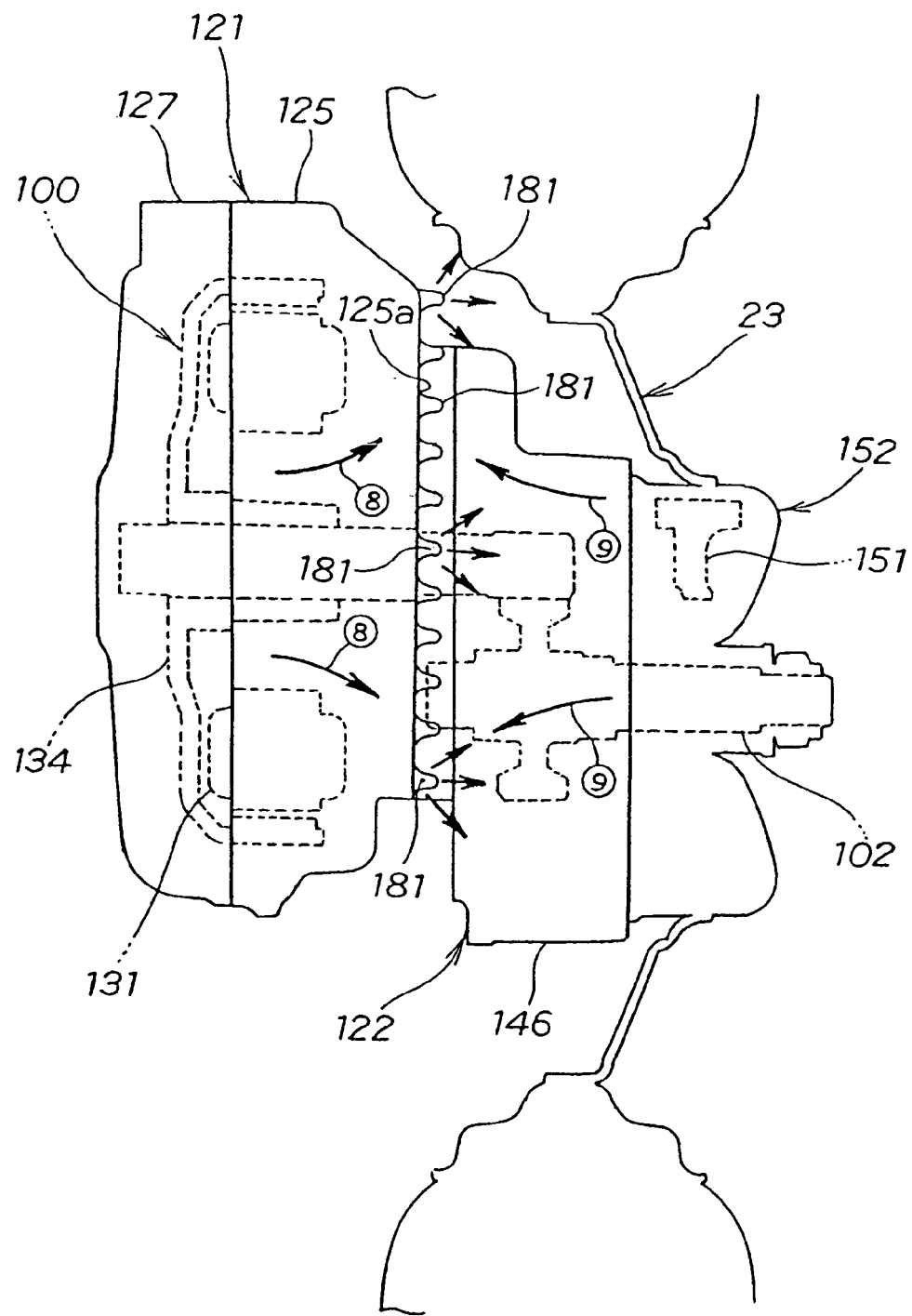
FIG. 13 is a second operational drawing showing cooling of the power unit according to the present invention.

FIG. 13 is a second operational drawing showing cooling of the power unit of the present invention, for describing cooling of the electric motor 100 side and the drum brake unit 122 side. If the electric motor 100 operates, a lot of heat is generated, particularly at a stator 131 side provided with a coil. Also, if the rear wheel 23 is braked by the drum brake unit 122, heat is generated by friction between the brake shoe 151 and the brake drum 152.

This heat flows from the electric motor 100 side to the first fns 181 . . . of the case body, as shown by arrows ⑧, ⑧, and flows from the drum brake 122 side, as shown by arrows ⑨, ⑨, the brake drum 152, the axle 102, the base section 146 and finally to the first fins 181 . . . of the case body 125. As a result, heat is radiated from the first fins 181 . . . to the atmosphere. In this manner, it is possible to cool the electric motor 10 and the drum brake unit 122, and also, since the first fins 181 . . . are positioned between the electric motor 100 and the drum brake unit 122, it is possible to make it difficult for heat to be conveyed from the drum brake unit 122 to the electric motor 100.

As has been described above with FIG. 8, FIG. 9 and FIG. 13, the present invention is first of all characterized by an electric vehicle 10 provided with a drum brake unit 122 on a rear wheel 23 rotated by drive force of an electric motor 100 (refer to FIG. 10), having the drum brake unit 122 attached to the electric motor 100, and first fins for cooling the electric motor 100 and the drum brake unit 122 being provided in the vicinity of connecting parts of the electric motor 100 and the drum brake unit 122, namely, at an inner side surface 125a of a case body 125.

It is possible to cool the electric motor 100 itself using the first fins 181, and it is also possible to remove heat generated by the drum brake unit 122 using the first fins 181, and to make it difficult for heat of the drum brake unit 122 to be conveyed to the electric motor 100. It is therefore possible to more efficiently cool the electric motor 100.

According to a second aspect of the present invention, an electric vehicle 10 is provided with a drum brake unit 122 on a rear wheel 23 rotated by drive force of an electric motor 100, having the drum brake unit 122 attached to a unit case 121 of the electric motor 100, with the unit case 121 divided into a two-part structure and first fins 181 provided on at least one of the divided case body 125 and a case cover 127.

It is possible to cause heat generated by the electric motor 100 to be radiated by the first fins 181, and it is also possible to cause heat generated by the drum brake unit 122 to be radiated by the first fins 181 via the unit case 121 of the electric motor 100. It is therefore possible to efficiently suppress rise in temperature of the electric motor 100. Also, since there is a simple structure in providing the fins 181 on the unit case 121, it is possible to suppress cost required for cooling.

According to a third embodiment of the present invention, a hole section 186 for passing an axle 102 of the rear wheel 23 is provided in the case body 125 where the fins 181 are provided. It is possible to support the axle 102 in the hole section 186 of the case body 125, and it is possible to carry out positioning of the first fins 181 side case body 125 and the rear wheel 21 using the axle 102.

According to a fourth embodiment of the present invention, the cooling apparatus is consists of fins. It is possible to carry natural cooling using traveling air using the fins, and it is possible to reduce weight compared to using forced a cooling apparatus such as a fan.

Figure 14:
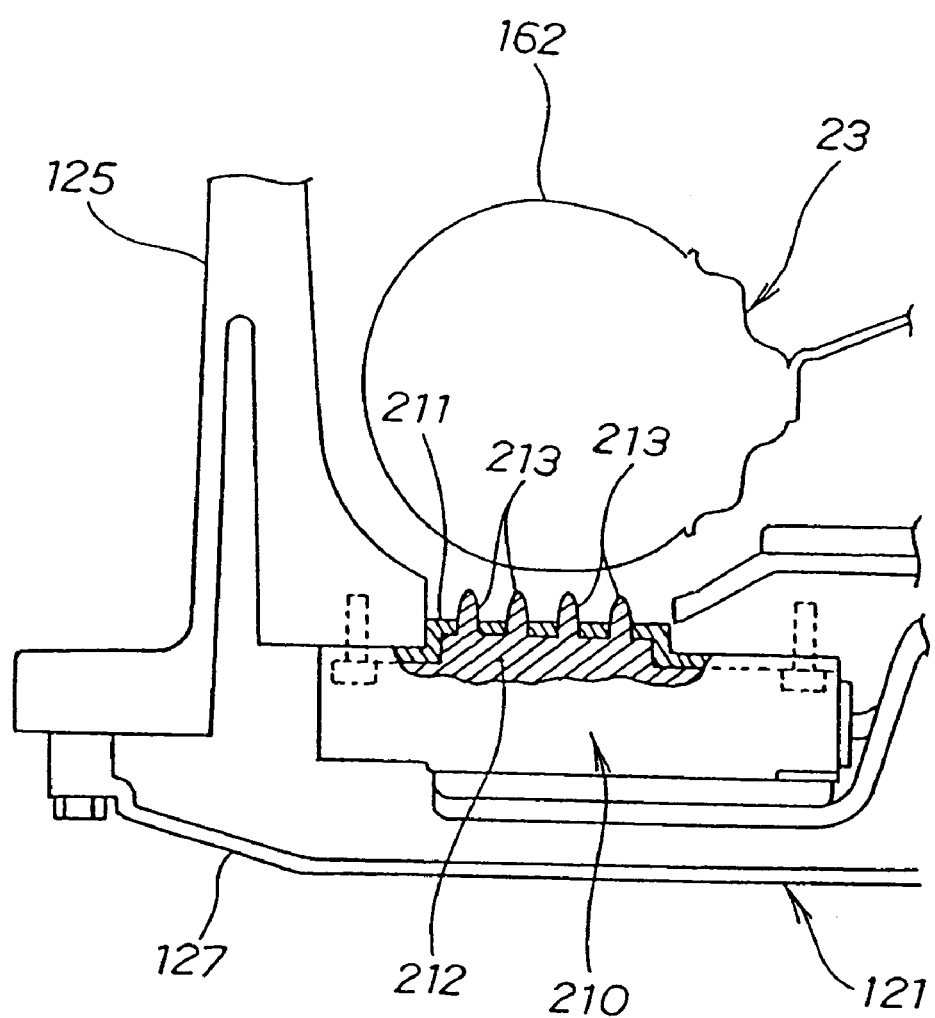
FIG. 14 is a cross sectional drawing showing another embodiment of a cooling structure for an electrical power supply section according to the present invention.

FIG. 14 is a cross sectional drawing showing another embodiment of a cooling mechanism for the electronic control module of the present invention. Structural components that are the same as the embodiment shown in FIG. 10 have the same numerals applied and a detailed description is omitted.

An electronic control module 210 has a heat sink 212 attached to FETs attached inside a case 211, and fourth fins 213 formed on this heat sink 212 is exposed to the outside through the case 211, and is adjacent to the rear wheel, specifically the tire 162.

In this way, by causing the fourth fins 213 of the heat sink 212 to be exposed to the outside, it is possible to release heat generated by the FETs directly from the fourth fins of the heat sink 212 to the atmosphere, and it is possible to more efficiently cool the FET and the electronic control module 210.

Figure 15:
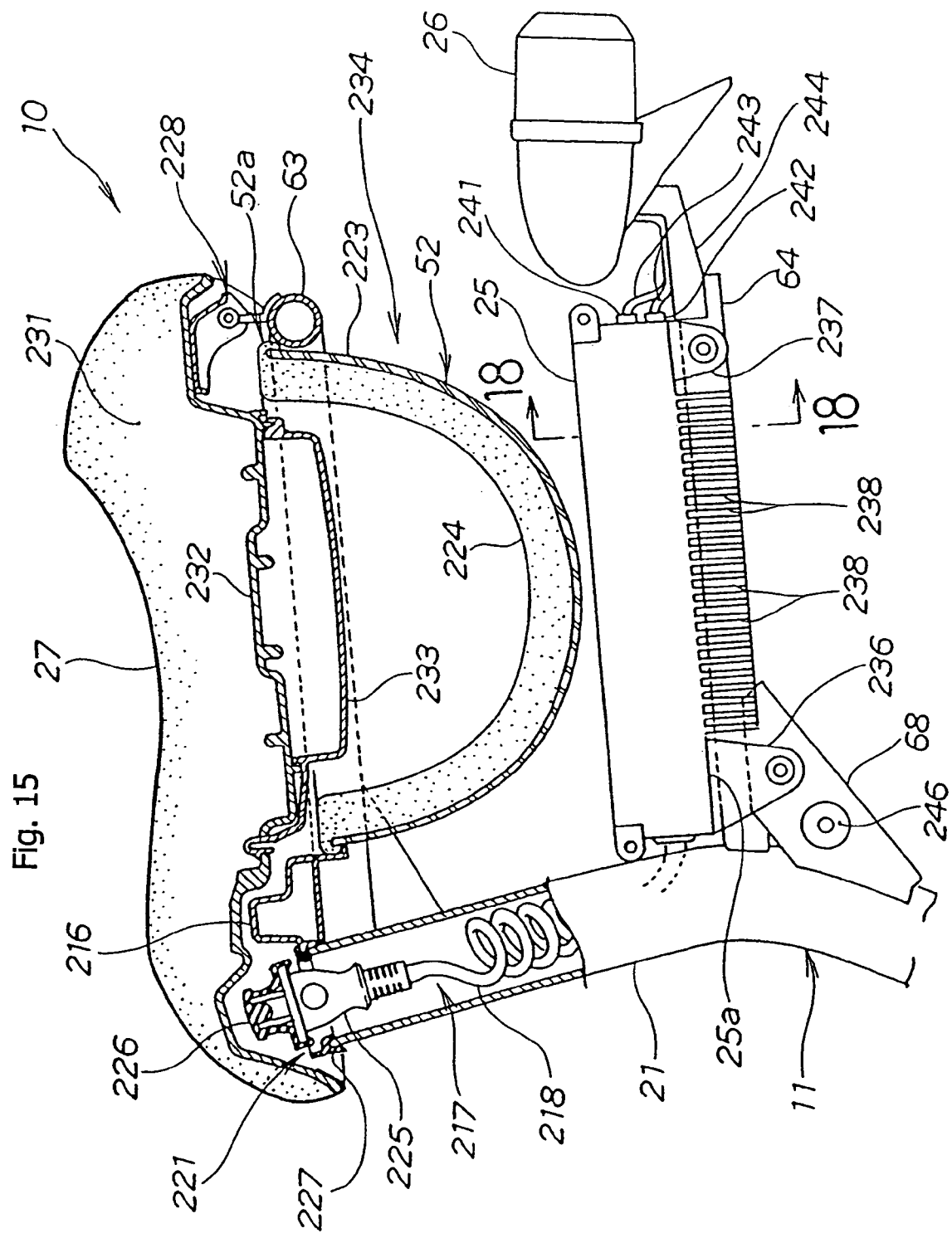
FIG. 15 is a rear side view (partial cross section) of the electric vehicle according to the present invention.

FIG. 15 is a rear section side elevation (partial cross section) of the electric vehicle of the present invention, and shows an edge of a helmet 52 having a substantially hemispherical outer surface held by hanging from a helmet support member 216 attached to the seat post 21 and a seat frame 63, a curly charger cord 218 connected to the charger/voltage converter unit 25 being contained in the hollow section 217 of the seat post 21, and an opening section 221 opening the hollow space 217 to the outside and above the helmet 52 being covered by the seat 27.

The helmet 52 is made up of an outer shell section 223 and a shock absorbing material 224 provided inside the outer shell member, with an edge section 52a of the helmet 52 spread outwards making it possible to hang from the helmet support section 216 and the seat frame 63.

Here, reference numeral 225 is a plug for the charger cord, 226 is a cap fitted over the plug 225, 227 is a fringe section attached to an upper edge of the seat post 21, 228 is seat hinge for attaching the seat 27 to the seat frame 63 in such a manner that it can be opened and closed, 231 is a seat cushion material, 232 is a seat bottom plate and 233 is a tray for storing documents etc. by attaching the seat bottom plate 232 in a detachable manner.

As described above, a space below the seat 27 is a property storage space 234 for storing a helmet 52, as property, and this storage space 234 is an open space without a partition separating from the outside.

By arranging this type of property storage space 234 directly below the seat 27, the helmet 52 will not get rain even if it rains, and it is not necessary to provide separate rain protection.

Also, since, regardless of the fact that there is an exposed space below the seat 27 of the electric vehicle 10 of this embodiment, the helmet 52 is stored below the seat 27, it is possible to give a novel impression where it is not possible to see that the helmet 52 is stored below the seat 27 at a glance, and it is possible to increase marketability of the electric vehicle 10.

The charger/voltage converter unit 25 is provided with vehicle body side attachment sections 236, 236 (only one reference numeral 236 is shown in the drawing) and vehicle body side attachment sections 237, 237 (only one reference numeral 237 is shown in the drawing) for attachment to the vehicle frame 11, and is positioned adjacent and almost touching the seat post 21, by attaching the vehicle body side attachment sections 236, 136 to a reinforcement section and attaching the vehicle body side attachment sections 237, 237 to the side surface of the mid-frame 64, with fifth fins 238 . . . provided on a lower surface 25a.

In this way, the charger/voltage converter unit 25 is attached in a state of being exposed to the vehicle frame 11, which means that compared to the related art where it is positioned inside the vehicle cover, the charger/voltage converter unit 25 can be more efficiently cooled. That is, since the charger/voltage converter unit 25 is arranged in the exposed space below the seat 27, heat generated by the charger/voltage converter unit 25 can be released directly into the atmosphere, and it is possible to improve heat dissipation.

Here, reference numerals 241 and 242 are terminals for connecting to leads 243, 243 extending from the tail lamp 26, 244 is a lamp attachment section provided integrally with the tail lamp 26 for attaching the tail lamp 26 to the mid-frame 64, and 246 is cushion upper end attachment section provided on the reinforcement member 60 for attaching the upper end of the rear shock absorber 24 (refer to FIG. 1).

That is, since the charger/voltage converter unit 25 and the tail lamp 26 are provided n a substantially integral manner, it is possible to make a connection distance between the charger/voltage converter unit 25 and the tail lamp 26 short. Also, since the charger/voltage converter unit 25 and the tail lamp 26 can be easily covered with the same cover, it is possible to reduce the manufacturing cost when provided this type of cover.

Figure 16:
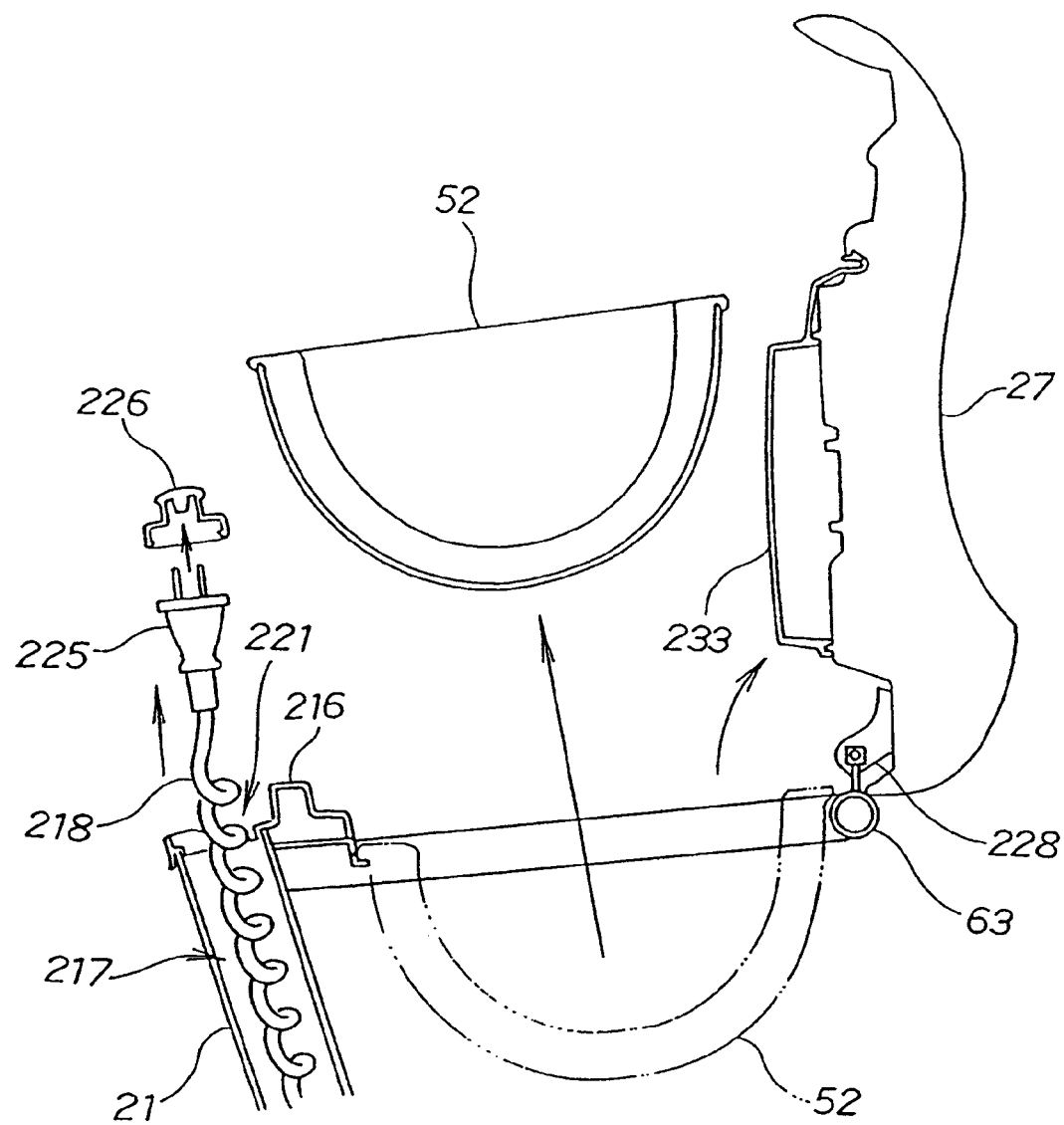
FIG. 16 is an operational drawing at the time of opening the seat according to the present invention.

FIG. 16 is a drawing showing operation at the time of opening the seat of the present invention. A seat lock, not shown, for locking the seat 27 to the seat frame 63 is taken off, and the seat 27 is swung upwards to open the seat 27. In this embodiment, the seat 27 is rotatably supported by a seat hinge 228 provided on a rear part of the seat frame 63.

Figure 17A:
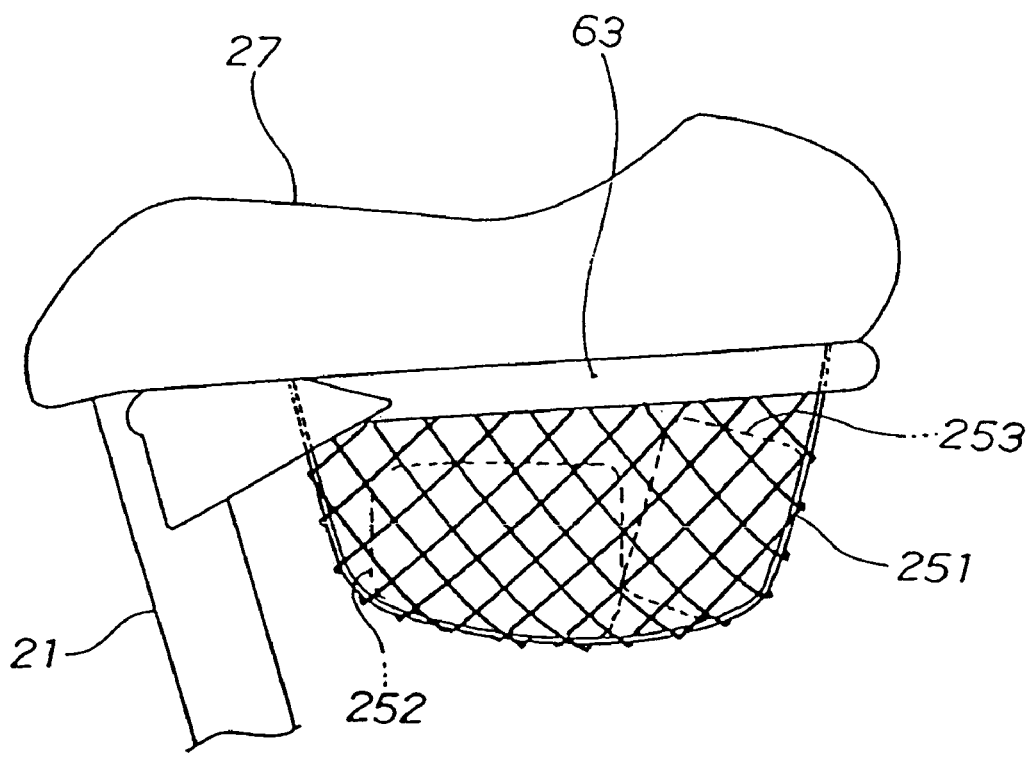
FIG. 17 is side elevations showing modified examples of a method of stowing articles below the seat according to the present invention.
Figure 17B:
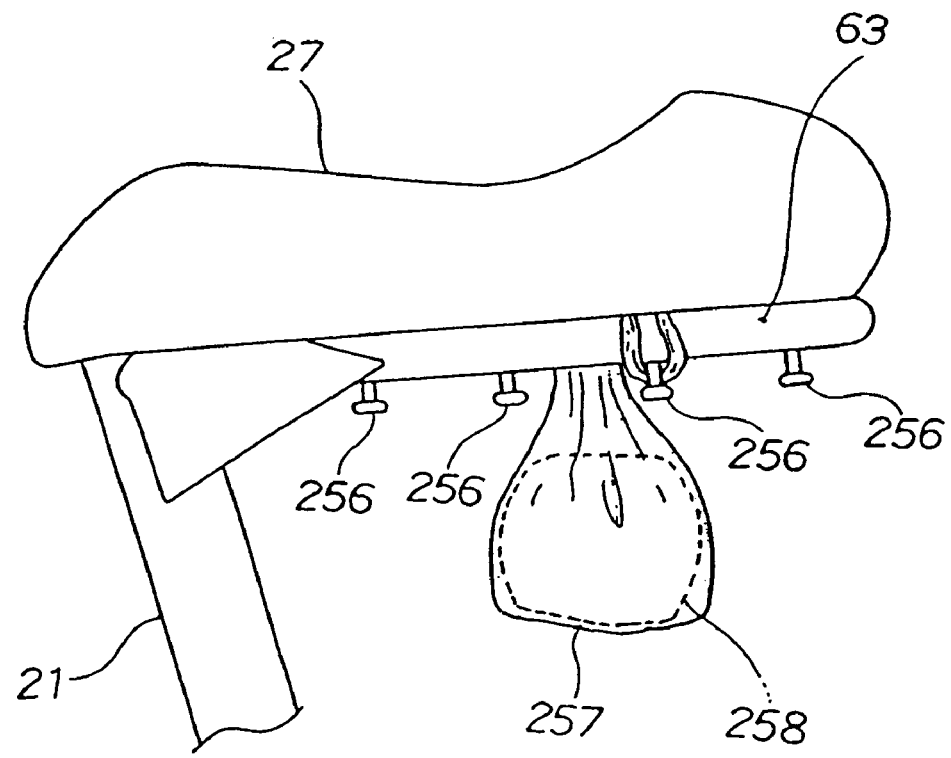

If the seat 27 is opened in this way, the helmet 52 can easily be removed upwards, it is possible to easily take out the charger cord 218 from the hollow section 217 of the seat post 21, and it is possible remove the cap 226 from the plug 225 of the charger cord 218 and to insert it into a wall socket. It is also possible to remove the tray 233 below the seat 27 and easily take out documents and manuals etc. FIG. 17(a) and FIG. 17(b) are side elevations showing modified examples of a method of stowing articles below the seat of the present invention. FIG. 17(a) shows a net 251 attached to the seat frame 63, and articles 252, 253 stored in the net 251. FIG. 17(b) shows hooks 256 attached to the seat frame 63, and a bag 257, for example, hung from the hooks 256 and articles 258 stored in the bag 257.

Figure 18A:
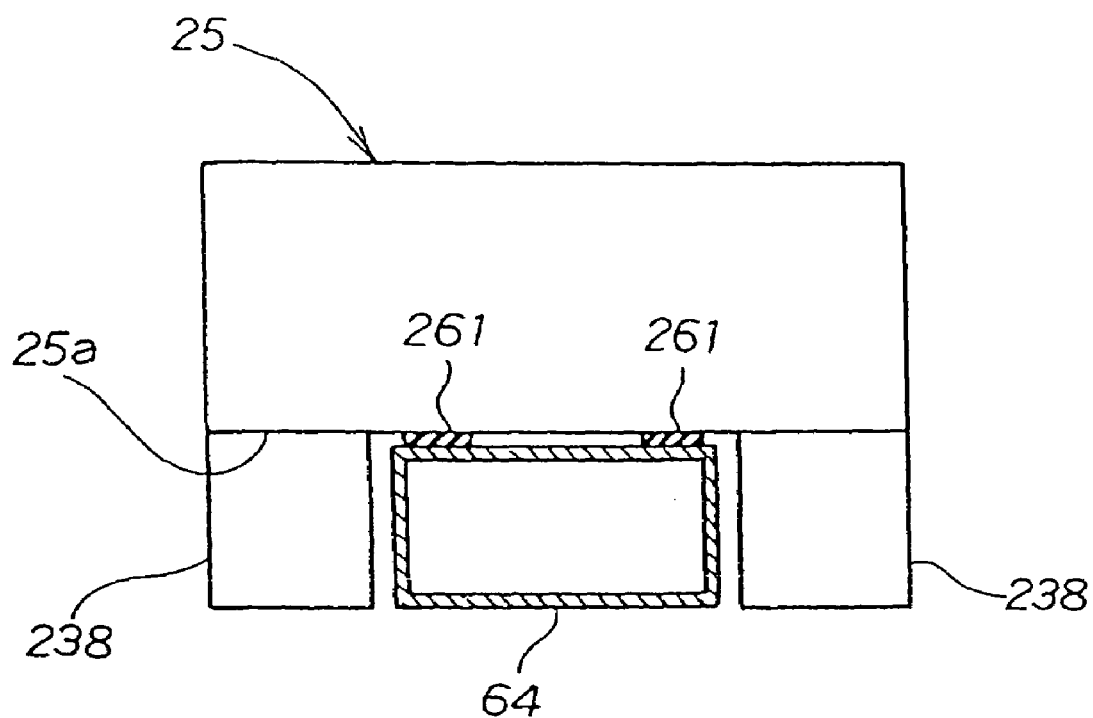
FIG. 18 is explanatory drawings of a charger/voltage converter unit according to the present invention.
Figure 18B:
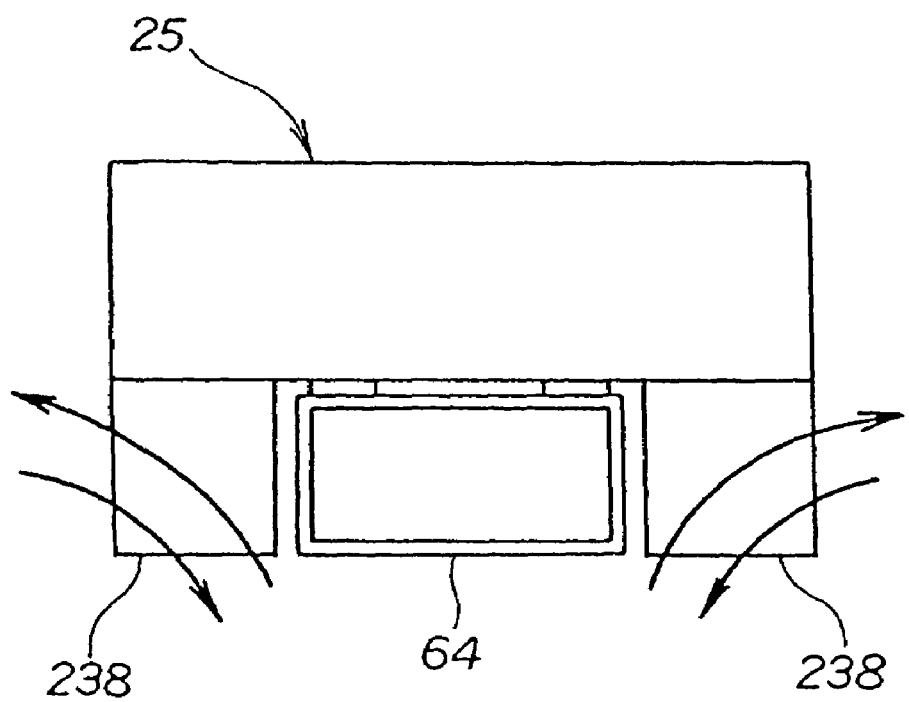
Figure 19:
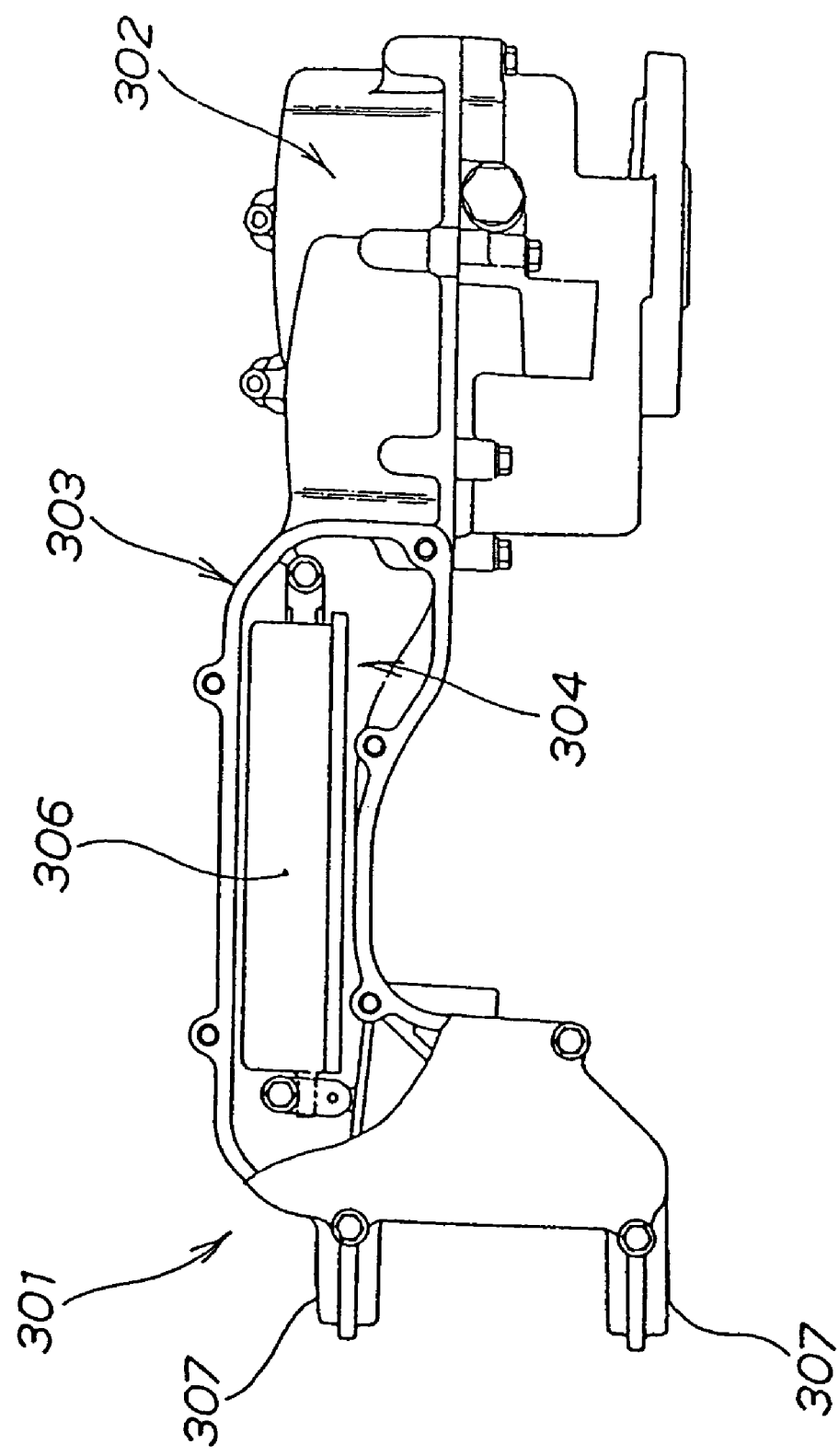
FIG. 19 is a bottom view showing a power unit of an electric vehicle of the background art.
Figure 20:
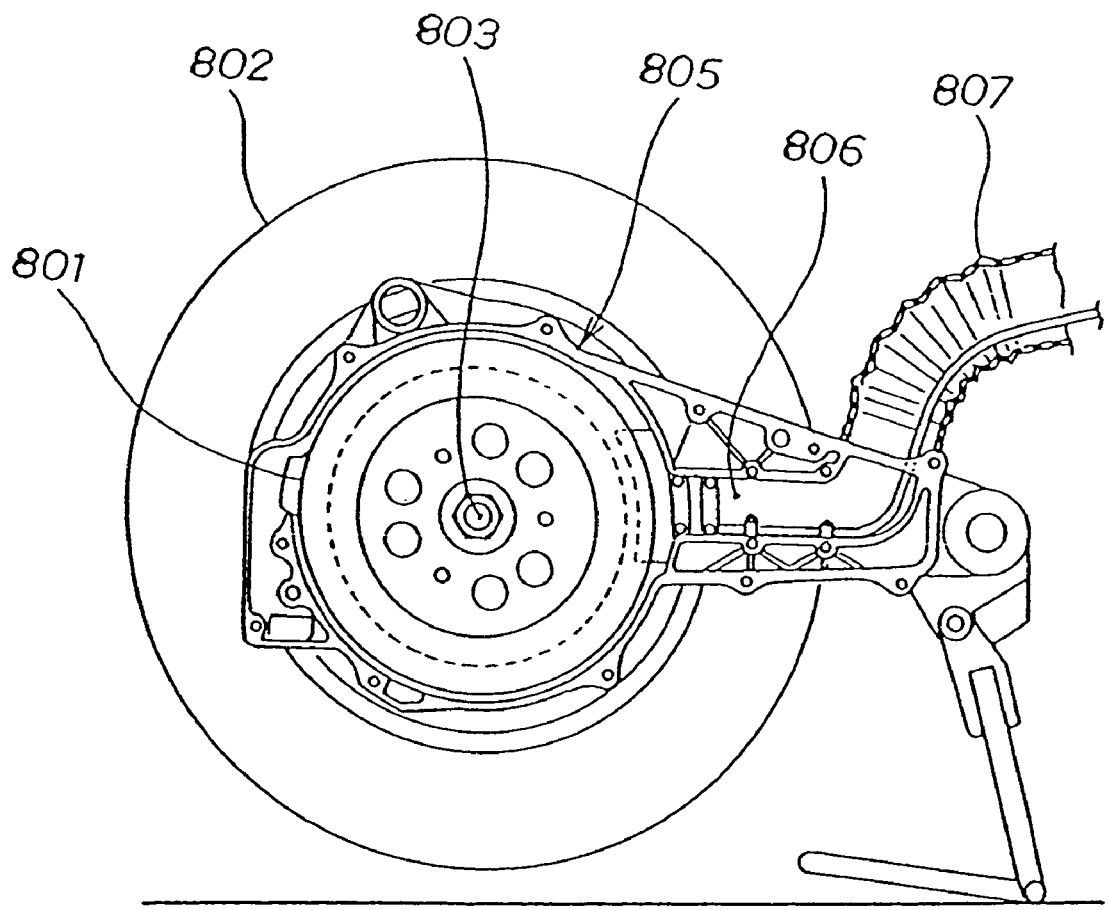
FIG. 20 is a rear side view of a portion of an electric vehicle of the background art.

FIG. 18(a) and FIG. 18(b) are explanatory drawings of the charger/voltage converter unit of the present invention, FIG. 18(a) being a cross section along line 18—18 in FIG. 15, and FIG. 18(b) being an operational drawing. In FIG. 18(a), fifth fins 238 projecting downwards and arranged on both sides of the mid-frame 64 are provided on a lower surface 25a of the charger/voltage converter unit 25. Reference numerals 261, 261 are cushion rubbers interposed between the mid-frame 64 and the charger/voltage converter unit 25.

In FIG. 18(b), if air flows in the direction of the arrows heat generated by the charger/voltage converter unit 25 is released from the fifth fins 238 . . . . In this way, it is possible to suppress increase in temperature of the charger/voltage converter unit 25.

This embodiment is provided with a first fin at the unit case but is not limited in this respect, and may also be provided at a base section of a drum brake unit.

The present invention achieves the following effects with the above-described configuration. Since the electric vehicle of claim 1 has a cooling apparatus for cooling the electric motor and the brake unit is provided between the electric motor and the brake, it is possible to cool the electric motor itself using the cooling apparatus, and it is also possible to remove heat generated by the brake unit using the cooling apparatus, and to make it difficult for heat of the brake unit to be conveyed to the electric motor. It is therefore possible to more efficiently cool the electric motor.

Since the electric vehicle of claim 2 has the control unit attached to a case of the electric motor, and the case is divided in two, with cooling fins provided on at least one of divided parts of the case, it is possible to cause heat generated by the electric motor to be radiated by the cooling fins, and it is also possible to cause heat generated by the brake unit to be radiated by the cooling fins via the case of the electric motor. Also, since there is a simple structure in providing the fins on the case, it is possible to suppress cost required for cooling.

Since the electric vehicle of claim 3 has a hole section provided in the cooling apparatus for passing an axle of the drive wheel, It is possible to support the axle in the hole section of the cooling apparatus, and it is possible to carry out positioning of the cooling apparatus and the drive wheel using the axle.

Since the electric vehicle of claim 4 has the cooling fin formed of fins, it is possible to carry out natural cooling using traveling air using the fins, and it is possible to reduce weight compared to using forced a cooling apparatus such as a fan.

Although the present invention has been described herein with respect to a specific illustrative embodiment thereof, the foregoing description is intended to be illustrative, and not restrictive. Those skilled in the art will realize that many modifications of the embodiment could be made within the spirit and essence of the invention. All such modifications are intended to be within the scope of the present invention as claimed.

Having thus, described the invention, what is claimed is:

1. An electric vehicle, comprising a drive wheel, a drum brake unit operatively connected to the drive wheel, an electric motor housed within a power unit case and operatively attached to the drive wheel for providing power thereto, the electric motor capable of rotating the drive wheel, and a cooling structure for cooling the electric motor and the brake unit;

wherein the cooling structure is situated between the electric motor and the drum brake unit, and wherein the drum brake unit is attached to the power unit case, and
wherein the vehicle further comprises an electronic control unit disposed on the power unit case at a location spaced apart from the electric motor, and wherein electronic control unit comprises cooling fins formed on a lateral side surface thereof.

2. The electric vehicle of claim 1, wherein the cooling structure comprises fins integrally molded into at least one exterior wall of said power unit case, and wherein a cooling effect is provided by the fins when air outside of the power unit case flows therepast.

3. The electric vehicle of claim 2, wherein the drive wheel includes a disc-shaped portion, the electronic control unit disposed outside of and spaced away from the disc-shaped portion of the drive wheel, and wherein the power unit case has a window formed therein to accommodate a portion of the electronic control unit.

4. The electric vehicle of claim 3, wherein the cooling fins formed on the electronic control unit are operatively attached to a side thereof which faces said window.

5. The electric vehicle of claim 1, wherein the cooling structure is provided with a hole section formed therein for passing an axle of the drive wheel.

6. The electric vehicle of claim 1, wherein the electric motor comprises a stator, wherein the cooling structure is disposed between the stator of the electric motor and the brake unit, wherein the cooling structure comprises fins extending outwardly on an exterior surface of a power unit case housing the stator, and wherein a cooling effect is provided by the fins when air outside of the power unit case flows therepast.

7. The electric vehicle of claim 1, wherein the vehicle further comprises a frame, and a battery tray attached to the frame for supporting a battery therein.

8. The electric vehicle of claim 7, further comprising a step plate attached to the frame which acts as a cover for the battery tray.

9. An electric vehicle, comprising
a drive wheel,
a brake unit operatively connected to the drive wheel,
an electric motor operatively attached to the drive wheel for providing power thereto, the electric motor capable of rotating the drive wheel,
a case for housing the electric motor, and
an electronic control unit for controlling operation of the electric motor, the electronic control unit disposed at a location spaced apart from the electric motor such that when viewed from a lateral side of the vehicle, the electronic control unit and electric motor do not overlap;
wherein the case comprises a window, the window disposed at a location such that when viewed from the lateral side of the vehicle, the window and electronic control unit overlap and cooling wind passes through the window to cool the electronic control unit, and wherein at least a portion of the electronic control unit is disposed inside the case of the electric motor, and the case comprises two sections, with cooling fins provided on an exterior surface of at least one of the case sections.

10. The electric vehicle of claim 9, wherein the case further houses at least a portion of each of the electric motor and the brake unit therein.

11. An electric vehicle, comprising:
a frame comprising a main frame portion and a swing arm pivotally attached to the main frame portion;
a rear drive wheel rotatably attached to the swing arm;
a brake unit operatively attached to the swing arm for selectively slowing rotation of said rear drive wheel;
an electric motor comprising a stator and being operatively attached to said swing arm for driving rotation of said rear drive wheel;
a battery tray attached to said main frame portion for housing a battery therein;
a battery housed in said battery tray;
an electronic control module operatively attached to said swing arm for concurrent movement therewith, said control module provided for controlling distribution of power from said battery to said electric motor, the electronic control module disposed at a location spaced apart from the electric motor such that when viewed from a lateral side of the vehicle, the electronic control unit and electric motor do not overlap;
wherein the swing arm comprises a window, the window disposed at a location such that when viewed from the lateral side of the vehicle, the window and electronic control unit overlap and cooling wind passes through the window to cool the electronic control unit; and
a cooling structure situated between said stator of the electric motor and said brake unit.

12. The electric vehicle of claim 11, wherein the electric motor is housed within a power unit case, wherein the cooling structure comprises fins integrally molded into at least one exterior wall of said power unit case, and wherein a cooling effect is provided by the fins when air outside of the power unit case flows therepast.

13. The electric vehicle of claim 12, wherein the power unit case has a window formed therein to accommodate a portion of the electronic control module.

14. The electric vehicle of claim 13, wherein the electronic control module has fins formed externally thereon, said fins being operatively attached to a side thereof which faces said window.

15. The electric vehicle of claim 11, wherein the cooling structure is provided with a hole section formed therein for passing an axle of the drive wheel.

16. The electric vehicle of claim 11, further comprising a step plate attached to the frame which acts as a cover for the battery tray.

* * * * *